US009711785B2

(12) United States Patent
Sonobe et al.

(10) Patent No.: US 9,711,785 B2
(45) Date of Patent: Jul. 18, 2017

(54) NEGATIVE ELECTRODE SLURRY COMPOSITION, LITHIUM ION SECONDARY BATTERY NEGATIVE ELECTRODE, AND LITHIUM ION SECONDARY BATTERY

(71) Applicant: ZEON CORPORATION, Tokyo (JP)

(72) Inventors: Kenya Sonobe, Tokyo (JP); Naoki Takahashi, Tokyo (JP); Norikazu Yamamoto, Tokyo (JP); Yusuke Adachi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 302 days.

(21) Appl. No.: 14/397,665

(22) PCT Filed: Jun. 6, 2013

(86) PCT No.: PCT/JP2013/065721
§ 371 (c)(1),
(2) Date: Oct. 29, 2014

(87) PCT Pub. No.: WO2013/183717
PCT Pub. Date: Dec. 12, 2013

(65) Prior Publication Data
US 2015/0132644 A1 May 14, 2015

(30) Foreign Application Priority Data
Jun. 7, 2012 (JP) ................. 2012-129710

(51) Int. Cl.
H01M 4/36 (2006.01)
H01M 4/133 (2010.01)
H01M 4/134 (2010.01)
H01M 4/38 (2006.01)
H01M 4/587 (2010.01)
H01M 4/62 (2006.01)
H01M 4/02 (2006.01)

(52) U.S. Cl.
CPC .......... H01M 4/364 (2013.01); H01M 4/133 (2013.01); H01M 4/134 (2013.01); H01M 4/386 (2013.01); H01M 4/587 (2013.01); H01M 4/622 (2013.01); H01M 4/625 (2013.01); H01M 2004/027 (2013.01); H01M 2220/30 (2013.01)

(58) Field of Classification Search
CPC ........ H01M 4/36; H01M 4/133; H01M 4/134; H01M 4/62; H01M 4/364; H01M 4/386; H01M 4/622; H01M 4/625; H01M 4/587; H01M 2004/027; H01M 2220/30; Y02E 60/122
See application file for complete search history.

(56) References Cited

U.S. PATENT DOCUMENTS

2003/0113626 A1* 6/2003 Maeda ............... H01M 4/621
429/217
2012/0189913 A1* 7/2012 Wakizaka ........... H01M 4/133
429/211

FOREIGN PATENT DOCUMENTS

| JP | H05-74461 A | 3/1993 |
|----|----|----|
| JP | 2000-067871 A | 3/2000 |
| JP | 2005063846 * | 3/2005 |
| JP | 2010-040228 A | 2/2010 |
| JP | 2010-182626 A | 8/2010 |
| JP | 2011-108373 A | 6/2011 |
| JP | 2011-204578 A | 10/2011 |
| JP | 2012-014939 A | 1/2012 |
| JP | 2012-099341 A | 5/2012 |
| JP | 2012-104406 A | 5/2012 |

OTHER PUBLICATIONS

JP2005M063846 MT.*
International Search Report; PCT/JP2013/065721; Aug. 13, 2013.
The extended European search report issued by the European Patent Office on Dec. 15, 2015, which corresponds to European Patent Application No. 13800504.6 and is related to U.S. Appl. No. 141397,665.
International Preliminary Report on Patentability and Translation of Written Opinion of the International Searching Authority; PCT/JP2013/065721 issued on Dec. 9, 2014.

* cited by examiner

Primary Examiner — Alex Usyatinsky
(74) Attorney, Agent, or Firm — Studebaker & Brackett PC

(57) ABSTRACT

Provided is a negative electrode slurry composition including a binder resin, a water-soluble polymer, and a negative electrode active material, wherein the binder resin including (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., and the negative electrode active material including a carbon-based active material and a silicon-based active material.

8 Claims, No Drawings

NEGATIVE ELECTRODE SLURRY COMPOSITION, LITHIUM ION SECONDARY BATTERY NEGATIVE ELECTRODE, AND LITHIUM ION SECONDARY BATTERY

TECHNICAL FIELD

The present invention relates to a negative electrode slurry composition capable of suppressing swelling of a negative electrode, particularly swelling during initial charge, a lithium ion secondary battery negative electrode, and a lithium ion secondary battery.

BACKGROUND ART

A further increase in demand for an electrochemical device such as a lithium ion secondary battery which is compact and lightweight, has high energy density, and is capable of repeatedly charging and discharging is expected even in view of environmental concerns. The lithium ion secondary battery has high energy density and thus is used in the fields of mobile phones, laptop personal computers, and the like. In addition, with an increase or development in use application, the need for further improvement in performance, such as a reduced resistivity or an increased capacity, in the electrochemical device has increased.

For example, in Patent Literature 1, a mixture of two styrene-butadiene copolymer latexes different in amount of bound styrene is used as a binder for the purpose of improving the mechanical strength and battery characteristics of a negative electrode in lithium ion secondary batteries having a high discharge capacity.

CITATION LIST

Patent Literature

Patent Literature 1: JP 2000-67871 A

SUMMARY OF INVENTION

Technical Problem

Incidentally, for further increasing the capacity of a lithium ion secondary battery, a silicon-based active material such as Si and silicon oxide ($SiO_x$) is used as a negative electrode active material. However, when the binder resin in Patent Literature 1 is used to prepare a negative electrode in the case where a silicon-based active material is used alone as a negative electrode active material, suppression of swelling of the negative electrode becomes insufficient, and resultantly battery characteristics such as a cycle characteristic and a rate characteristic may not be sufficiently exhibited.

An object of the present invention is to provide a negative electrode slurry composition capable of suppressing swelling of a negative electrode, a lithium ion secondary battery negative electrode, and a lithium ion secondary battery.

Solution to Problem

The inventors have extensively conducted studies, and resultantly found that when a negative electrode slurry composition is used prepared by using a predetermined styrene-butadiene copolymer latex and a polymer latex having a specific type of core-shell hetero-phase structure as binder resins, and a silicon-based active material in combination with a carbon-based active material as a negative electrode active material, swelling of the obtained negative electrode during charge-discharge can be suppressed, leading to completion of the present invention.

That is, according to the present invention, there are provided (1) a negative electrode slurry composition including a binder resin, a water-soluble polymer, and a negative electrode active material, wherein the binder resin including (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., and the negative electrode active material including a carbon-based active material and a silicon-based active material;

(2) the negative electrode slurry composition according to (1), wherein the (B) polymer latex has a glass transition temperature in dynamic viscoelasticity measurement with at least one peak at −60° C. to 10° C. and has a glass transition temperature in dynamic viscoelasticity measurement with at least one peak at 10° C. to 65° C.;

(3) the negative electrode slurry composition according to (1) or (2), wherein the negative electrode slurry composition includes 0.1 to 50 parts by mass of the (B) polymer latex in terms of a solid content based on 100 parts by mass of the (A) styrene-butadiene copolymer latex in terms of a solid content;

(4) the negative electrode slurry composition according to any of (1) to (3), wherein the negative electrode active material includes 0.1 to 50 parts by mass of the silicon-based active material based on 100 parts by mass of the carbon-based active material contained in the negative electrode active material;

(5) the negative electrode slurry composition according to any of (1) to (4), wherein the silicon-based active material is $SiO_x$ (0.01≤x<2) formed of at least one of SiO and $SiO_2$ and Si;

(6) the negative electrode slurry composition according to any of (1) to (5), wherein at least one of the silicon-based active materials is combined with conductive carbon;

(7) a lithium ion secondary battery negative electrode formed by applying the negative electrode slurry composition according to any of (1) to (6) onto a current collector and drying the negative electrode slurry composition; and (8) a lithium ion secondary battery including the lithium ion secondary battery negative electrode according to (7).

Advantageous Effects of Invention

According to the present invention, there can be provided a negative electrode slurry composition capable of suppressing swelling of a negative electrode, a lithium ion secondary battery negative electrode, and a lithium ion secondary battery.

DESCRIPTION OF EMBODIMENTS

Hereinafter, a negative electrode slurry composition of the present invention will be described. The negative electrode slurry composition of the present invention is a negative electrode slurry composition including a binder resin, a water-soluble polymer, and a negative electrode active material, wherein the binder resin including (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., and the negative electrode active material including a carbon-based active material and a silicon-based active material.

(Binder Resin)

The binder resin to be used for the negative electrode material of the present invention includes (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C.

((A) Styrene-Butadiene Copolymer Latex)

The (A) styrene-butadiene copolymer latex is a copolymer having styrene and 1,3-butadiene as main constituents. Here, the main constituent means that in the copolymer latex, the total content of a polymerization unit of styrene (styrene unit) and a polymerization unit of 1,3-butadiene (1,3-butadiene unit) exceeds 50% by mass in the pre-polymerization units of the polymer. While the mass ratio (St/BD) of the styrene unit (St) and the 1,3-butadiene unit (BD) is not particularly limited as long as it satisfies the predefined gel amount and glass transition temperature, the mass ratio (St/BD) is preferably 42/58 to 87/13, further preferably 49/51 to 80/20, most preferably 55/45 to 70/30. When the amount of styrene is excessively large, the resulting negative electrode is poor in flexibility as an electrode plate, so that cracking tends to occur. Also, when the amount of styrene is small, the negative electrode tends to be swollen in charge-discharge of the battery.

For the styrene-butadiene copolymer latex, a monomer component other than styrene and 1,3-butadiene may be copolymerized as long as the effect of the present invention is exhibited. The monomer component is not particularly limited as long as it is, for example, a conjugated diene-based monomer, an unsaturated carboxylic acid monomer or any other known copolymerizable monomer.

Examples of the conjugated diene-based monomers include isoprene, 2,3-dimethyl-1,3-butadiene, 1,3-pentadiene and piperylene, and 1,3-butadiene, isoprene, 2,3-dimethyl-1,3-butadiene and the like are preferred.

Examples of the unsaturated carboxylic acid monomer include unsaturated monocarboxylic acids and derivatives thereof, and unsaturated dicarboxylic acids, acid anhydrides thereof and derivatives thereof. Examples of the unsaturated monocarboxylic acid include acrylic acid, methacrylic acid and crotonic acid. Examples of the derivative of the unsaturated monocarboxylic acid include 2-ethylacrylic acid, iso-crotonic acid, α-acetoxyacrylic acid, β-trans-aryloxyacrylic acid, α-chloro-β-E-methoxyacrylic acid and β-diaminoacrylic acid. Examples of the unsaturated dicarboxylic acid include maleic acid, fumaric acid and itaconic acid. Examples of the acid anhydride of the unsaturated dicarboxylic acid include maleic anhydride, acrylic anhydride, methyl maleic anhydride and dimethyl maleic anhydride. Examples of the derivative of the unsaturated dicarboxylic acid include methyl allyl maleates such as methyl maleic acid, dimethyl maleic acid, phenyl maleic acid, chloromaleic acid, dichloromaleic acid and fluoromaleic acid; and maleic acid esters such as diphenyl maleate, nonyl maleate, decyl maleate, dodecyl maleate, octadecyl maleate and fluoroalkyl maleate.

Among them, unsaturated monocarboxylic acids such as acrylic acid and methacrylic acid and unsaturated dicarboxylic acids such as maleic acid, fumaric acid and itaconic acid are preferred, acrylic acid, methacrylic acid and itaconic acid are more preferred, and itaconic acid is most preferred from the viewpoint of improving stability of particles in a water dispersion of a styrene-butadiene copolymer.

Specific examples of other copolymerizable monomers include styrene-based monomers such as styrene, α-methylstyrene, β-methylstyrene, p-t-butylstyrene and chlorostyrene; nitrile group-containing monomers such as acrylonitrile and methacrylonitrile; acrylamide-based monomers such as acrylamide, N-methylolacrylamide and N-butoxymethylacrylamide; methacrylamide-based monomers such as methacrylamide, N-methylolmethacrylamide and N-butoxymethylmethacrylamide; glycidyl group-containing monomers such as glycidyl acrylate, glycidyl methacrylate and ally glycidyl ether; sulfonic acid group-containing monomers such as sodium styrenesulfonate and acrylamide methyl propane sulfonic acid; amino group-containing methacrylic acid-based monomers such as dimethylaminoethyl methacrylate and diethylaminoethyl methacrylate; alkoxy group-containing methacrylic acid-based monomers such as methoxy polyethylene glycol monomethacrylate; fluorine-containing acrylic acid-based monomers or fluorine-containing methacrylic acid-based monomers such as (meth)acrylic acid perfluoroalkyl esters such as 2,2,2-trifluoroethyl(meth)acrylate, β-(perfluorooctyl)ethyl(meth)acrylate, 2,2,3,3-tetrafluoropropyl(meth)acrylate, 2,2,3,4,4,4-hexafluorobutyl(meth)acrylate, 1H,1H,9H-perfluoro-1-nonyl(meth)acrylate, 1H,1H,11H-perfluoroundecyl(meth)acrylate, perfluorooctyl(meth)acrylate and 3-[4-[1-trifluoromethyl-2,2-bis[bis(trifluoromethyl)fluoromethyl]ethynyloxy]benzoxy]-2-hydroxypropyl(meth)acrylate; and unsaturated dicarboxylic acid monoesters such as monooctyl maleate, monobutyl maleate and monooctyl itaconate. In addition, copolymerizable monomers having crosslinkable and reactive functional groups can also be added.

Examples of such monomers include known monomers listed in "Polymer Latex" (Shinkobunshi Bunko 26) (Kobunshikankokai, 1st edition), P131 to P134. Among them, preferred examples include styrene-based monomers, nitrile group-containing monomers, polycarboxylic acid monomers, alkoxy group-containing methacrylic acid-based monomers and fluorine-containing acrylic acid-based monomers.

Known copolymerizable monomers such as the above-mentioned conjugated diene-based monomers are known to affect the gel amount and glass transition temperature of the styrene-butadiene copolymer. In the present invention, the added amount of the monomer is not particularly limited as long as the gel amount and the glass transition temperature each fall within a predefined range. For example, the added amount of the unsaturated carboxylic acid monomer is preferably 0.1 to 6 parts by mass, more preferably 0.5 to 5 parts by mass based on 100 parts by mass of styrene-butadiene copolymer because the binding property of a current collector and a negative electrode active material to improve the negative electrode strength, and resultantly a secondary battery negative electrode having an excellent cycle characteristic can be obtained. The above-mentioned conjugated diene-based monomers, unsaturated carboxylic acid monomers and other known copolymerizable monomers may be used in combination of two or more thereof.

The method for producing the (A) styrene-butadiene copolymer latex is not particularly limited, and the (A) styrene-butadiene copolymer latex can be produced by, for example, emulsion-polymerizing the above-mentioned styrene and 1,3-butadiene, and further the above-mentioned various kinds of copolymerizable monomer components in water with a polymerization initiator added preferably in the presence of an emulsifier. Note that, other additives can also be blended at the time of emulsification polymerization. The number average particle size of the obtained polymer (latex) is preferably 50 to 500 nm, further preferably 70 to 400 nm because the strength and flexibility of the obtained negative electrode are improved.

At this time, the emulsifier is not particularly limited, examples thereof include sodium dodecylbenzenesulfonate, sodium lauryl sulfate, sodium dodecyldiphenyletherdisulfonate and sodium succinic acid dialkylester sulfonates, and the emulsifier may be a so called reactive emulsifier that has an unsaturated bond. Among them, sodium dodecyldiphenyletherdisulfonate is preferred because it has high versatility at the time of manufacture, and causes less bubbling. They may be used in combination of two or more thereof.

The use amount of the emulsifier is not particularly limited, and is, for example, preferably 0.1 to 10.0 parts by mass, more preferably 0.15 to 5 parts by mass, especially preferably 0.2 to 2.5 parts by mass based on 100 parts by mass of the total of styrene, 1,3-butadiene, and further other copolymerizable monomers as raw materials because the polymerization reaction stably proceeds, so that a styrene-butadiene copolymer dispersed in water can be obtained.

Examples of the polymerization initiator is sodium persulfate (NaPS), ammonium persulfate (APS) and potassium persulfate (KPS), and among them, sodium persulfate and ammonium persulfate are preferred, and ammonium persulfate is more preferred. When ammonium persulfate or sodium persulfate is used as a polymerization initiator, deterioration of the cycle characteristic of the obtained lithium ion secondary battery can be suppressed.

The use amount of the polymerization initiator is not particularly limited, and is, for example, preferably 0.5 to 2.5 parts by mass, more preferably 0.6 to 2.0 parts by mass, especially preferably 0.7 to 1.5 parts by mass based on 100 parts by mass of the total of styrene, 1,3-butadiene, and further other copolymerizable monomers as raw materials because an increase in viscosity of the negative electrode slurry composition is prevented, so that a stable slurry composition can be obtained.

Other additives may include molecular weight modifiers and chain transfer agents, and examples thereof include alkyl mercaptans such as n-hexyl mercaptan, n-octyl mercaptan, t-octyl mercaptan, n-dodecyl mercaptan, t-dodecyl mercaptan and n-stearyl mercaptan; xanthogen compounds such as dimethyl xanthogen disulfide and diisopropyl xanthogen disulfide; thiuram-based compounds such as terpinolen, tetramethylthiuram disulfide, tetraethylthiuram disulfide and tetramethylthiuram monosulfide; phenol-based compounds such as 2,6-di-t-butyl-4-methylphenol and styrenated phenol; allyl compounds such as allyl alcohol; halogenated hydrocarbon compounds such as dichloromethane, dibromomethane and carbon tetrabromide; thioglycolic acid, thiomalic acid, 2-ethylhexyl thioglycolate, dipehnylethylene and α-methylstyrene dimers.

Among them, alkyl mercaptans are preferred, and t-dodecyl mercaptan is more preferably used from the viewpoint of suppression of a side reaction. They may be used in combination of two or more thereof.

At this time, the use amount of the additive is not particularly limited, and is, for example, preferably 0 to 5 parts by mass, more preferably 0 to 2.0 parts by mass based on 100 parts by mass of the total of styrene, 1,3-butadiene, and further other copolymerizable monomers as raw materials.

A surfactant may be used during the polymerization. The surfactant may be any of an anionic surfactant, a nonionic surfactant, a cationic surfactant and an amphoteric surfactant. Specific examples of the anionic surfactant include sulfuric acid ester salts of higher alcohols such as sodium lauryl sulfate, ammonium lauryl sulfate, sodium dodecyl sulfate, ammonium dodecyl sulfate, sodium octyl sulfate, sodium decyl sulfate, sodium tetradecyl sulfate, sodium hexadecyl sulfate and sodium octadecyl sulfate; alkyl benzene sulfonic acid salts such as sodium dodecylbenzenesulfonate, sodium laurylbenzenesulfonate and sodium hexadecylbenzenesulfonate; and aliphatic sulfonic acid salts such as sodium lauryl sulfonate, sodium dodecyl sulfonate and sodium tetradecyl sulfonate. Two or more thereof may be used. The use amount of the surfactant is preferably 0.5 to 10 parts by mass, more preferably 1 to 5 parts by mass based on 100 parts by mass of the total of styrene, 1,3-butadiene, and further other copolymerizable monomers as raw materials.

Further, various kinds of additives such as pH adjusters such as sodium hydroxide and ammonia; dispersing agents, chelating agents, oxygen scavengers, builders and seed latexes for adjusting a particle size can be appropriately used at the time of polymerization. Particularly, emulsion polymerization using a seed latex is preferred. The seed latex refers to a dispersion of fine particles that provide nuclei for the reaction at the time of emulsion polymerization. The fine particle often has a particle size of 100 nm or less. The fine particle is not particularly limited, and a general-purpose polymer such as an acryl-based polymer is used. By seed polymerization, copolymer latex particles having relatively uniform particle sizes are obtained.

The (A) styrene-butadiene copolymer latex has a glass transition temperature with a single peak in a range of −30° C. to 60° C., preferably in a range of −20° C. to 40° C., more preferably in a range of −10° C. to 30° C. Here, the glass transition temperature is measured by dynamic viscoelasticity measurement. Specifically, a water dispersion of the copolymer latex is dried under an environment of a humidity of 50% and a temperature of 23 to 25° C. for 3 days to obtain a film. The film is dried in a hot air oven at 120° C. for 1 hour, and a strip having a thickness of 1.0±0.1 mm, a length of 50±2 mm and a width of 5±0.1 mm is then cut out from the film, and used as a test piece for dynamic viscoelasticity measurement. Using a viscoelasticity spectrometer (DMS) EXSTAR DMS5800 (manufactured by Seiko Instruments Inc.) as a dynamic viscoelasticity measurement device, measurement is performed under conditions of deformation mode: tension, frequency: 1 Hz, measurement temperature: −100° C. to 180° C. and temperature elevation rate: 3° C./minute to determine a storage elastic modulus, a loss elastic modulus and a tan δ. The temperature at a peak top of the tan δ obtained at this time is defined as a glass transition temperature. The glass transition temperature can be controlled by the amount ratio of styrene-butadiene, and the compositions and amounts of other copolymerizable monomers added.

When the glass transition temperature is excessively low, swelling of the negative electrode during charge tends to increase, leading to deterioration of the cycle characteristic. Also, when the glass transition temperature is excessively high, adhesion between negative electrode active materials tends to be reduced, leading to swelling of the negative electrode.

Furthermore, the gel amount of the (A) styrene-butadiene copolymer is 70 to 98%, preferably 75 to 95%, more preferably 85 to 93%. Here, the gel amount is a value that represents a mass ratio of a solid content insoluble in tetrahydrofuran to the total solid content of the styrene-butadiene copolymer latex. Specifically, a water dispersion of the copolymer latex is dried under an environment of a humidity of 50% and a temperature of 23 to 25° C. for 3 days to obtain a film. The film is dried in a hot air oven at 120° C. for 1 hour, followed by obtaining a film having a thickness of 3±0.3 mm. The film is cut to a 1 mm square, and about 1 g of the film is precisely weighed. The mass of the film piece obtained by the cutting is defined as W0. This film piece is immersed in 100 g of tetrahydrofuran (THF) under an environment of 23 to 25° C. for 24 hours. Thereafter, the film piece taken out from THF is dried in vacuum at 105° C. for 3 hours, and a mass W1 of an insoluble matter is measured. Then, a gel amount (%) is calculated in accordance with the following formula.

Gel amount (%)=$W1/W0 \times 100$

The gel amount can be controlled by the polymerization temperature of the styrene-butadiene copolymer latex, the added amounts and types of the molecular weight modifier and the chain transfer agent, and further the compositions and amounts of other copolymerizable monomers added.

When the gel amount is excessively large, a homogeneous coated film tends to be hardly obtained during preparation of the negative electrode, and resultantly battery characteristics such as a cycle characteristic tend to be deteriorated. Also, when the gel amount is excessively small, the negative electrode tends to be easily swollen with an electrolyte solution, leading to swelling of an electrode plate.

((B) Polymer Latex)

The (B) polymer latex has two or more glass transition temperatures. Specifically, the (B) polymer latex has a glass transition temperature having at least one peak on the low-temperature side, and has a glass transition temperature having at least one peak on the high-temperature side. Here, the glass transition temperature is measured similarly to the dynamic viscoelasticity measurement method for the (A) styrene-butadiene copolymer latex. The glass transition temperature on the low-temperature side is −100° C. to 10° C., preferably −60° C. to 10° C., more preferably −45° C. to −10° C., further preferably −40° C. to −20° C. When the glass transition temperature on the low-temperature side is excessively low, swelling of the resulting negative electrode increases, leading to deterioration of the cycle characteristic. Also, when the glass transition temperature on the low-temperature side is excessively high, adhesion between negative electrode active materials is reduced.

Furthermore, the glass transition temperature on the high-temperature side is 10° C. to 100° C., preferably 10° C. to 65° C., more preferably 20° C. to 50° C., further preferably 25° C. to 45° C. When the glass transition temperature on the high-temperature side is excessively low, swelling of the resulting negative electrode increases, leading to deterioration of the cycle characteristic. Also, when the glass transition temperature on the high-temperature side is excessively high, adhesion between negative electrode active materials is reduced.

Furthermore, the (B) polymerization latex has a hetero-phase structure in which a particle structure includes a phase formed of two or more mutually different polymers. That is, the particle structure forming a hetero-phase structure is a single particle formed by physically or chemically binding two or more polymers having different glass transition temperatures, and is not a particle including a single phase formed of a single polymer such as a block polymer.

Forms of the (B) polymer latex include a core-shell structure in which in a spherical particle, a core part and a shell part are formed of different polymers; a side-by-side structure in which two or more polymers are arranged side by side; a snowman-like structure in which in a core-shell structure, a part of a polymer at the core part is exposed to a shell part; and an octopus-like structure in which a different kind of polymer particle is embedded in the surface of a spherical polymer particle to form a united body, and the (B) polymer latex having a core-shell structure is preferred because control is easily performed in production of the (B) polymer latex. Further, two or more of various kinds of hetero-phase structures as described above may be combined to form one composite particle.

The (B) polymer latex having a core-shell structure is obtained by polymerizing a mixture of two or more monomers in stages. A method for producing a latex as described above is disclosed in "Polymer Latex" (Shinkobunshi Bunko 26) (Polymer Publication, 1st edition), P38 to P45, Japanese Patent No. 4473967 and so on. As a specific example, the (B) polymer latex having a core-shell structure is produced in the following manner: a monomer that provides a polymer in the first stage is polymerized to obtain a polymer (seed particles) as a core, and a monomer that provides a polymer in the second stage is polymerized under the polymer (seed particles) as a core. In this case, a core-shell structure may be formed by adding and polymerizing a monomer for a shell after polymerizing a monomer for a core in the same reaction vessel, or a core-shell structure may be formed by polymerizing a monomer for a shell in another reaction vessel while using as a core seed particles formed in the other reaction vessel.

The polymerization conversion ratio in the polymerization reaction of the polymer for a core is normally 70% by mass or more, preferably 90% by mass or more. When the polymerization conversion ratio is excessively low, it is difficult for the (B) polymer latex to have a core-shell structure. Examples of the method for adding a monomer for a shell include a method in which the monomer is added collectively in a total amount and polymerized; a method in which a part of the monomer is added and polymerized, and the other part of the monomer is continuously or intermittently added; a method in which the monomer is added continuously from the start of the polymerization reaction of a shell; and so on. Furthermore, the polymerization conversion ratio in the polymerization reaction of the polymer for a shell is normally 70% by mass or more, preferably 90% by mass or more. The polymerization temperature is normally 30 to 90° C., preferably 50 to 80° C. for both polymerization for a core and polymerization for a shell. The polymerization time is normally 2 to 10 hours in each case.

While the ratio of the core and the shell in the (B) polymer latex having a core-shell structure is not particularly limited, the mass ratio of core part:shell part is normally 50:50 to 99:1, preferably 60:40 to 99:1, more preferably 70:30 to 99:1. As the polymer compound that forms the core part and the shell part, polymer compounds such as a fluorine-based polymer, a diene-based polymer, an acrylate-based polymer, a polyimide, a polyamide or a polyurethane can be arbitrarily selected and used. Among them, it is preferred to include at least one of a fluorine-based polymer, a diene-based polymer and an acrylate-based polymer, and a diene-based polymer and an acrylate-based polymer are further preferred.

The fluorine-based polymer is a polymer containing a monomer unit including a fluorine atom, and examples thereof include fluorine resins such as polytetrafluoroethylene and polyvinylidene fluoride.

The diene-based polymer is a polymer containing a monomer unit derived from a conjugated diene such as butadiene or isoprene, or a hydrogenation product thereof, and examples thereof include conjugated diene homopolymers such as polybutadiene and polyisoprene (that may be carboxy-modified), aromatic vinyl-conjugated diene copolymers such as SBR, which have a styrene-butadiene copolymer as a main backbone, vinyl cyanate-conjugated diene copolymers such as NBR, hydrogenated SBR and hydrogenated NBR.

The acrylate-based polymer is a polymer containing a monomer unit derived from an acrylic acid ester or a methacrylic acid ester, and examples thereof include copolymers of ethylene and methacrylic acid esters such as ethylene-methyl acrylate copolymers, ethylene-methyl methacrylate copolymers, ethylene ethyl acrylate copolymers and ethylene-ethyl methacrylate copolymers, and graft polymers obtained by grafting a radical-polymerizable monomer to a copolymer of ethylene and a methacrylic acid ester. Note that, examples of the radical-polymerizable monomer to be used for graft polymerization include methyl methacrylate, acrylonitrile and methacrylic acid. Further, copolymers of ethylene and methacrylic acid such as ethylene-acrylic acid copolymers and ethylene-methacrylic acid copolymers which have a high ratio of ethylene units are exemplified.

The method for polymerizing the (B) polymer latex is not particularly limited, and for example, a known method can be employed such as the polymerization method described in connection with the (A) styrene-butadiene copolymer latex.

The amount of the (B) polymer latex contained in the binder resin to be used for the negative electrode slurry composition of the present invention is preferably 0.1 to 50 parts by mass, more preferably 1 to 35 parts by mass, further preferably 5 to 20 parts by mass in terms of a solid content based on 100 parts by mass of the (A) styrene-butadiene copolymer in terms of a solid content. When the amount of the (B) copolymer latex is excessively large or excessively small, swelling of the resulting negative electrode increases, leading to deterioration of the cycle characteristic.

The total amount of the (A) styrene-butadiene copolymer and the (B) polymer latex that are used for the negative electrode slurry composition of the present invention is preferably 0.5 to 10 parts by mass, more preferably 0.8 to 3 parts by mass based on 100 parts by mass of the negative electrode active material. When the total amount of the (A) styrene-butadiene copolymer and the (B) polymer latex is excessively small, adhesion between negative electrode active materials is reduced. When the total amount of the (A) styrene-butadiene copolymer and the (B) polymer latex is excessively large, the resulting negative electrode has an increased resistance, leading to deterioration of the cycle characteristic.

(Water-Soluble Polymer)

The water-soluble polymer to be used for the negative electrode slurry composition of the present invention is not particularly limited. Examples of the cellulose-based polymer may include cellulose compounds such as carboxymethyl cellulose, carboxyethyl cellulose, ethyl cellulose, hydroxymethyl cellulose, hydroxypropyl cellulose and carboxyethyl methyl cellulose (including salts such as ammonium salts and alkali metal salts thereof), starch oxide, starch phosphate, casein, various kinds of modified starches, polyethylene oxide, polyethylene glycol, polyvinyl alcohol, polyvinyl pyrrolidone, polysulfonic acid, polycarboxylic acid, and acrylic acid or methacrylic acid copolymers (including salts such as ammonium salts and alkali metal salts thereof). They may be used in combination of two or more thereof.

Among them, cellulose compounds (including salts such as ammonium salts and alkali metal salts thereof), polysulfonic acid, polycarboxylic acid, and acrylic acid or methacrylic acid copolymers (including salts such as ammonium salts and alkali metal salts thereof) are preferred from the viewpoint of excellent stability of a slurry in preparation of a negative electrode and suppression of swelling of the obtained negative electrode. At this time, the acrylic acid or methacrylic acid copolymer (including salts such as ammonium salts and alkali metal salts thereof) can be used copolymerized with copolymerizable components other than acrylic acid and methacrylic acid, such as methyl acrylate and methyl methacrylate, the resulting copolymer is preferred because various kinds of characteristics can be controlled, and further it is preferred that the copolymer and the above-mentioned cellulose compound are used in combination because viscosity stability of the negative electrode slurry composition can also be improved.

In the cellulose compound, the 1% aqueous solution viscosity thereof is preferably 100 to 7000 mPa·s, more preferably 500 to 5000 mPa·s, especially preferably 1500 to 3500 mPa·s because the viscosity of the negative electrode slurry composition can be made suitable for coating, an electrode plate having excellent adhesion is obtained and swelling during charge-discharge is effectively suppressed. The 1% aqueous solution viscosity can be adjusted by an average polymerization degree of the cellulose compound. When the average polymerization degree is high, the aqueous solution viscosity tends to increase. The 1% aqueous solution viscosity is a value measured by a single cylindrical rotational viscometer (25° C., number of rotations=60 rpm, spindle shape: 1) in accordance with JIS Z8803; 1991.

In the present invention, the degree of etherification of a cellulose-based polymer suitable as a water-soluble polymer is preferably 0.6 to 1.5, more preferably 0.7 to 1.2, especially preferably 0.8 to 1.0 because affinity with the negative electrode active material can be reduced to prevent the water-soluble polymer from being localized on the surface of the negative electrode active material, and adhesion between the negative electrode active material layer and the current collector in the negative electrode is retained, so that adhesion of the negative electrode is notably improved. Here, the degree of etherification refers to a substitution degree of such as carboxymethyl groups to (three) hydroxyl groups per one unit of anhydrous glucose in cellulose. Theoretically, the degree of etherification can be a value of 0 to 3. It is shown that the ratio of hydroxyl groups in cellulose decreases and the ratio of substitution products in cellulose increase as the degree of etherification becomes higher, and the ratio of hydroxyl groups in cellulose increases and the ratio of substitution products in cellulose decreases as the degree of etherification becomes lower. The degree of etherification (substitution degree) is determined in accordance with the following method and equation.

First, 0.5 to 0.7 g of a sample is precisely weighed, and incinerated in a magnetic crucible. After the sample is cooled, the obtained incinerated product is transferred to a 500 ml beaker, 250 ml of water is added, 35 ml of N/10 sulfuric acid further is added with a pipette, and the mixture is boiled for 30 minutes. This is cooled, and a phenolphthalein indicator is added to back titrate an excessive acid with N/10 potassium hydroxide, and a substitution degree is calculated from the following equation (I) and (II).

$$A=(a \times f - b \times f1)/\text{sample (g)} - \text{alkaline degree (or +acid degree)} \quad (I).$$

$$\text{Substitution degree} = M \times A/(10000 - 80A) \quad (II).$$

In the above equations (I) and (II), "A" is an amount (ml) of N/10 sulfuric acid consumed by bound alkali metal ions in 1 g of the sample. "a" is a use amount (ml) of N/10 sulfuric acid. "f" is a titer coefficient of N/10 sulfuric acid. "b" is a titration amount (ml) of N/10 potassium hydroxide. "f1" is a titer coefficient of N/10 potassium hydroxide. "M" is a weight average molecular weight of the sample.

The content of a water-soluble polymer in the negative electrode slurry composition of the present invention is preferably 0.05 to 10 parts by mass, further preferably 0.08 to 3 parts by mass based on 100 parts by mass of the negative electrode active material. When the amount of the water-soluble polymer is excessively small, adhesion between negative electrode active materials is reduced. Also, when the amount of the water-soluble polymer is excessively large, the resulting negative electrode has an increased resistance, leading to deterioration of the cycle characteristic.

(Negative Electrode Active Material)

The negative electrode active material to be used for the negative electrode slurry composition of the present invention includes a carbon-based active material, and at least one of silicon and a silicon-based active material. The carbon-based active material refers to an active material having carbon, into which lithium can be inserted, as a main backbone, and is not particularly limited, and specific examples thereof include carbonaceous materials and graphitic materials. The carbonaceous material generally refers to a low-graphitization (low-crystallinity) carbon material obtained by heat-treating (carbonizing) a carbon precursor at 2000° C. or lower (the lower limit of the treatment temperature is not particularly limited, but may be, for example, 500° C. or higher), and the graphitic material refers to a graphitic material which is obtained by heat-treating easily graphitizable carbon at 2000° C. or higher (the upper limit of the treatment temperature is not particularly limited, but may be, for example, 5000° C. or lower) and which has high crystallinity close to graphite.

Examples of the carbonaceous material include easily graphitizable carbon in which the structure of carbon is easily changed with a heat treatment temperature, and hardly graphitizable carbon having a structure close to an amorphous structure, which is represented by glassy carbon.

Examples of the easily graphitizable carbon include carbon materials having as a raw material a tar pitch obtained from petroleum and coal, for example cokes, mesocarbon microbeads (MCMB), mesophase pitch-based carbon fibers and thermally decomposed vapor-phase growth carbon fibers. MCMB is a carbon fine particle obtained by separating and extracting a mesophase microsphere generated in the process of heating a pitch around 400° C. The mesophase pitch-based carbon fiber is a carbon fiber having as a raw material a mesophase pitch obtained as the mesophase microspheres are grown and combined. The thermally decomposed vapor-phase growth carbon fiber is a carbon fiber obtained by (1) a method in which acryl polymer fibers etc. are thermally decomposed, (2) a method in which pitch is spun and thermally decomposed, or (3) a catalysis vapor-phase growth (catalysis CVD) method in which a hydrocarbon is thermally decomposed in a vapor phase using nanoparticles of iron or the like as a catalyst.

Examples of the hardly graphitizable carbon include phenol resin sintered bodies, polyacrylonitrile-based carbon fibers, pseudo-isotropic carbon and furfuryl alcohol resin sintered bodies (PFA).

Examples of the graphitic material include natural graphite and artificial graphite. Examples of the artificial graphite include artificial graphite obtained by heat treatment mainly at 2800° C. or higher, graphitized MCMB obtained by heat-treating MCMB at 2000° C. or higher, and graphitized mesophase pitch-based carbon fibers obtained by heat-treating mesophase pitch-based carbon fibers at 2000° C. or higher.

Among carbon-based active materials, graphitic materials are preferred. When a graphitic material is used, the density of the active material layer of the negative electrode is easily increased, a negative electrode including an active material layer having a density of 1.6 g/cm$^3$ or more (the upper limit of the density is not particularly limited, but may be 2.2 g/cm$^3$ or less) is easily prepared. When the negative electrode including an active material layer having a density in the above-mentioned range, the effect of the present invention is remarkably exhibited.

The volume average particle size of the carbon-based active material is preferably 0.1 to 100 μm, more preferably 0.5 to 50 μm, especially preferably 1 to 30 μm because the negative electrode slurry composition is easily prepared.

The specific surface area of the carbon-based active material is preferably 0.3 to 20.0 m$^2$/g, more preferably 1.0 to 15.0 m$^2$/g, further preferably 3.0 to 10.0 m$^2$/g because the number of active spots on the surface of the carbon-based active material is increased, so that the lithium ion secondary battery has an excellent output characteristic.

The silicon-based active material refers to an active material having silicon which is capable of alloying reaction with lithium as a main component, and is not particularly limited, and examples thereof include Si, SiO, SiO$_2$ and SiO$_x$. Furthermore, it is preferred that as a silicon-based active material, SiO$_x$ (0.01≤x<2) formed of at least one of SiO and SiO$_2$, and Si because swelling of the negative electrode active material itself is suppressed. Here, SiO$_x$ represents a general term of silicon monoxide which is a non-stoichiometric ratio having a structure in which nano-level Si crystals are precipitated in a SiO$_2$ amorphous phase. The compound is known for its production method and characteristics from JP 2002-47404 A and Journal of Power Sources 170 (2007) 456-459. The method for producing the compound is not particularly limited, and examples thereof may include a method in which a silicon monoxide gas generated by heating a mixture of SiO$_2$ and Si (metal silicon) is cooled and precipitated, and a method in which SiO is subjected to heat treatment to cause a disproportionation reaction of Si and SiO$_2$ to proceed.

It is preferred that the silicon-based active material is combined with conductive carbon because due to combination with conductive carbon, swelling of silicon itself during charge can be lessened and a conductive path is formed. The method for combination is not particularly limited, and examples thereof include a method in which combination is performed by coating a silicon-based active material by a CVD method (chemical vapor deposition method) or a PVD method (physical vapor deposition method) using a compound providing a carbon source, a method in which combination is performed by granulating a mixture containing conductive carbon and a silicon-based active material, and a method in which an organic substance such as a polymer providing a conductive carbon source is adsorbed to the surface of a silicon-based active material, and directly subjected to heat treatment to carbonize the organic substance.

Preferred examples of the CVD method (chemical vapor deposition method) include a method in which by heat-treating $SiO_x$ in a temperature range of 900 to 1400° C., preferably 1000 to 1400° C., more preferably 1050 to 1300° C., further preferably 1100 to 1200° C. under an atmosphere including at least an organic gas and/or vapor, disproportionation of $SiO_x$ into a composite of silicon and silicon dioxide is accelerated, and its surface is subjected to chemical vapor deposition; a method in which a silicon-based active material is disproportionated beforehand by heat-treating at 900 to 1400° C., preferably 1000 to 1400° C., more preferably 1100 to 1300° C. under an inert gas atmosphere, the silicon composite etc. thus obtained is ground to a grain size of preferably 0.1 to 50 μm, the ground product is heated at 800 to 1400° C. under an inert gas stream beforehand, and subjected to heat treatment in a temperature range of 800 to 1400° C., preferably 900 to 1300° C., more preferably 1000 to 1200° C. under an atmosphere including at least an organic gas and/or vapor, and the surface is subjected to chemical vapor deposition; and a method in which a silicon-based active material is subjected to a chemical vapor deposition treatment with an organic gas and/or vapor in a temperature range of 500 to 1200° C., preferably 500 to 1000° C., more preferably 500 to 900° C. beforehand, and subjected to heat treatment in a temperature range of 900 to 1400° C., preferably 1000 to 1400° C., more preferably 1100 to 1300° C. under an inert gas atmosphere to be disproportionated.

Preferred examples of the method for granulating a mixture containing conductive carbon and a silicon-based active material may include the grinding and press-bonding method disclosed in JP 2002-216751 A.

In addition, in the present invention, a known negative electrode active material other than a carbon-based active material and a silicon-based active material may be added within the bounds of not departing from the object. Examples of the single metal and alloy that form a lithium alloy include metals such as Ag, Al, Ba, Bi, Cu, Ga, Ge, In, Ni, P, Pb, Sb, Sn, Sr and Zn, compounds containing the metals, and oxides, sulfides, nitrides, silicides, carbides and phosphides thereof. Further, lithium titanium composite oxides represented by $Li_xTi_yM_zO_4$ (0.7≤x≤1.5, 1.5≤y≤2.3, 0≤z≤1.6, M is Na, K, Co, Al, Fe, Ti, Mg, Cr, Ga, Cu, Zn and Nb) are included. Two or more thereof may be used.

(Negative Electrode Slurry Composition)

The negative electrode slurry composition can be obtained by mixing the above-described binder resin, water-soluble polymer and negative electrode active material, and substances such as a medium for adjusting the viscosity of a slurry, a preservative, an electrical conductivity imparting material, a reinforcement material, a dispersing agent, a leveling agent, an antioxidant, an electrolyte solution additive having a function to suppress decomposition of an electrolyte solution, and the like, which are used as necessary.

While the mixing method is not particularly limited, examples thereof include methods using mixers such as a stirring-type mixer, a shaking-type mixer and a rotary mixer. Further, examples of the mixing method include methods using dispersing and kneading devices such as a homogenizer, a ball mill, a sand mill, a roll mill, a planetary mixer and a planetary kneader.

(Medium)

As the medium, one similar to the solvent used in polymerization of the (A) styrene-butadiene copolymer latex and the (B) polymer latex can be used. The ratio of the medium is not particularly limited, and can be appropriately adjusted so that the slurry has properties suitable for subsequent steps. Specifically, the ratio of the medium can be adjusted so that the ratio of the solid in the negative electrode slurry composition (a substance remaining as a constituent of the electrode active material layer after the slurry is dried and heated) is 30 to 70% by mass, preferably 40 to 60% by mass.

(Preservative)

As the preservative, any preservative may be used, but particularly a benzisothiazoline-based compound represented by the following general formula (1), 2-methyl-4-isothiazoline-3-one or a mixture thereof is preferably used, and particularly a mixture thereof is more preferred.

{Chem. 1}

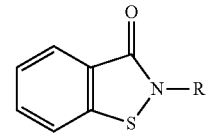

(1)

In the formula (1), R represents a hydrogen atom or an alkyl group with a carbon number of 1 to 8. When a mixture of the benzisothiazoline-based compound represented by the general formula (1) and 2-methyl-4-isothiazoline-3-one is used, the ratio of these compounds is preferably 1:10 to 10:1 in terms of a mass ratio. The content ratio of the preservative in the negative electrode slurry composition is preferably 0.001 to 0.1 parts by mass, more preferably 0.001 to 0.05 parts by mass, further preferably 0.001 to 0.01 parts by mass based on 100 parts by mass of the negative electrode active material.

(Electrical Conductivity Imparting Material)

As the electrical conductivity imparting material, conductive carbons such as acetylene black, ketjen black, carbon black, gas-phase carbon fibers and carbon nanotubes can be used. Alternatively, carbon powders such as graphite, fibers and foils of various kinds of metals, and so on can be used. By using an electrical conductivity imparting material, electrical contact between electrode active materials can be improved, and the discharge load characteristic can be improved particularly when the electrical conductivity imparting material is used for a lithium ion secondary battery. The amount of the electrical conductivity imparting material is preferably 0.001 to 0.1 parts by mass, more preferably 0.001 to 0.05 parts by mass, further preferably 0.001 to 0.01 parts by mass based on 100 parts by mass of the negative electrode active material. These electrical conductivity imparting materials may be used in combination of two or more thereof.

(Reinforcement Material)

As the reinforcement material, various kinds of inorganic and organic spherical, plate-shaped, rod-shaped or fibrous fillers can be used. By using a reinforcement material, a tough and flexible electrode can be obtained, and an excellent long-term cycle characteristic can be obtained.

The content ratio of the electrical conductivity imparting material and reinforcement agent in the negative electrode active material layer is preferably 0.01 to 20 parts by mass, further preferably 1 to 10 parts by mass based on 100 parts by mass of the negative electrode active material from the viewpoint of exhibiting a high capacity and a high load characteristic.

(Dispersing Agent)

Examples of the dispersing agent include anionic compounds, cationic compounds, nonionic compounds and polymer compounds. The dispersing agent is selected according to an electrode active material and an electrical conductivity imparting material to be used. The content ratio of the dispersing agent in the negative electrode active material layer is preferably 0.01 to 10 parts by mass based on 100 parts by mass of the negative electrode active material because a negative electrode slurry composition excellent in stability is obtained, so that a smooth electrode is obtained, and a battery having a high capacity is obtained.

(Leveling Agent)

Examples of the leveling agent include surfactants such as alkyl-based surfactants, silicon-based surfactants, fluorine-based surfactants and metal-based surfactants. By mixing the above-mentioned surfactants, repelling that occurs during coating can be prevented, and smoothness of the negative electrode can be improved. The content ratio of the leveling agent in the negative electrode active material layer is preferably 0.01 to 10 parts by mass based on 100 parts by mass of the negative electrode active material from the viewpoint of productivity during preparation of an electrode, smoothness and battery characteristics.

(Antioxidant)

Examples of the antioxidant include phenol compounds, hydroquinone compounds, organic phosphorus compounds, sulfur compounds, phenylenediamine compounds and polymer type phenol compounds. The polymer type phenol compound is a polymer having a phenol structure in the molecule, and a polymer type phenol compound having a mass average molecular weight of 200 to 1000, preferably 600 to 700 is preferably used. The content ratio of the antioxidant in the negative electrode active material layer is preferably 0.01 to 10 parts by mass, further preferably 0.05 to 5 parts by mass based on 100 parts by mass of the negative electrode active material from the viewpoint of stability of the negative electrode slurry composition, a battery capacity and a cycle characteristic.

(Lithium Ion Secondary Battery Negative Electrode)

The lithium ion secondary battery negative electrode of the present invention is an electrode having a negative electrode active material layer which is formed by applying and drying a negative electrode slurry composition and a current collector. While the method for producing a negative electrode is not particularly limited, examples thereof include a method in which a negative electrode slurry composition is applied to at least one, preferably both, of the surfaces of a current collector, and heated and dried to form a negative electrode active material layer.

The method for applying a negative electrode slurry composition to a current collector is not particularly limited. Examples thereof include a doctor blade method, a dipping method, a reverse roll method, a direct roll method, a gravure method, an extrusion method, a comma direct coating, a slide die coating and a brush coating method. Examples of the drying method include drying by warm air, hot air and low-humidity air, vacuum drying, and drying by irradiation of (far) infrared rays and electron beams. The drying time is normally 5 to 30 minutes, the drying temperature is normally 40 to 180° C. The active material layer may be formed by repeatedly applying and drying the negative electrode slurry composition multiple times.

The current collector is not particularly limited as long as it is a material which has electric conductivity and is electrochemically durable, but is preferably a metal material because it has heat resistance, and examples thereof include iron, copper, aluminum, nickel, stainless steel, titanium, tantalum, gold and platinum.

The shape of the current collector is not particularly limited, but is preferably a sheet shape. Preferably, the current collector is subjected to a surface roughening treatment before being used in order to enhance the adhesive strength with the negative electrode active material layer. Examples of the surface roughening method include a mechanical polishing method, an electrolytic polishing method and a chemical polishing method. In the mechanical polishing method, a coated abrasive with abrasive particles firmly fixed thereto, grindstone, an emery wheel, a wire brush with a steel wire or the like is used. Furthermore, an intermediate layer may be formed on the surface of the current collector for enhancing the adhesive strength and conductivity of the negative electrode active material layer.

Preferably, a pressure treatment such as press processing is performed after the negative electrode active material layer is formed on the current collector. Press processing is performed using, for example, a roll press machine with a metal roll, an elastic roll or a heating roll, and a sheet press machine, or the like. The press temperature may be room temperature or may be an elevated temperature as long as it is lower than a temperature at which the coated film of the active material layer is dried, but the press temperature is normally room temperature (standard room temperature is 15 to 35° C.)

Press processing (roll press) by a roll press machine is preferred because a long sheet-shaped negative electrode plate can be continuously press-processed. Roll press may be performed by either fixed-position press or constant-pressure press.

(Lithium Ion Secondary Battery)

The lithium ion secondary battery of the present invention is a secondary battery including a positive electrode, a negative electrode, a separator and an electrolyte solution. The negative electrode is the lithium ion secondary battery negative electrode described above.

(Positive Electrode)

The positive electrode is formed by laminating on a current collector a positive electrode active material layer containing a positive electrode active material and a positive electrode binder. As the current collector, a current collector that is used for the above-described lithium ion secondary battery negative electrode can be used.

The positive electrode active material layer can be obtained in the following manner: a positive electrode slurry composition formed by mixing a positive electrode binder, a positive electrode active material, and other optional substances to be used as necessary is applied onto, for example, a current collector, and dried. Examples of the optional substances may include substances similar to those described above as substances that can be contained in the negative electrode slurry composition, and the blending ratio of those optional substances may be similar to the blending ratio of those in the negative electrode slurry composition.

The method for preparing a positive electrode slurry composition and method for forming a positive electrode active material layer using the positive electrode slurry composition can be carried out similarly to the above-described method for preparing a negative electrode slurry composition and method for forming a negative electrode active material layer using the negative electrode slurry composition.

(Positive Electrode Active Material)

Examples of the electrode active material for the positive electrode of the lithium ion secondary battery include transition metal oxides, transition metal sulfides, lithium-containing composite metal oxides of lithium and a transition metal, and organic compounds. As the transition metal, Ti, V, Cr, Mn, Fe, Co, Ni, Cu, Mo or the like is used.

Examples of the transition metal oxide include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$ and $V_6O_{13}$, and among them, MnO, $V_2O_5$, $V_6O_{13}$ and $TiO_2$ are preferred from the viewpoint of cycle stability and a capacity.

Examples of the transition metal sulfide include $TiS_2$, $TiS_3$, amorphous $MoS_2$ and FeS. Examples of the lithium-containing composite metal oxides include lithium-containing composite metal oxides having a layered structure, lithium-containing composite metal oxides having a spinel structure and lithium-containing composite metal oxides having an olivine-type structure.

Examples of the lithium-containing composite metal oxide having a layered structure include lithium-containing cobalt oxide ($LiCoO_2$), lithium-containing nickel oxide ($LiNiO_2$), lithium composite oxides of Co—Ni—Mn, lithium composite oxides of Ni—Mn—Al and lithium composite oxides of Ni—Co—Al. Examples of the lithium-containing composite metal oxide having a spinel structure include lithium manganate ($LiMn_2O_4$), and Li $[Mn_{3/2}M_{1/2}]O_4$ with Mn partially substituted with other transition metals (where M is Cr, Fe, Co, Ni, Cu or the like). Examples of the lithium-containing composite metal oxide having an olivine-type structure include olivine-type lithium phosphate compounds represented by $Li_xMPO_4$ (wherein M is at least one selected from Mn, Fe, Co, Ni, Cu, Mg, Zn, V, Ca, Sr, Ba, Ti, Al, Si, B and Mo; $0 \leq X \leq 2$).

Examples of the organic compound include conductive polymers such as polyacetylene and poly-p-phenylene. An iron-based oxide having poor electric conductivity may be used as an electrode active material covered with a carbon material by causing a carbon source substance to exist during reduction firing. Also, these compounds may be partially element-substituted. The positive electrode active material for the lithium secondary battery may be a mixture of the inorganic compound (transition metal oxide, transition metal sulfide, lithium-containing composite metal oxide, etc.) and an organic compound.

The volume average particle size of the positive electrode active material is normally 1 to 50 µm, preferably 2 to 30 µm because the amount of the positive electrode binder used in preparation of the later-described positive electrode slurry composition can be reduced, a reduction in capacity of the battery can be suppressed, and the viscosity is easily adjusted to a proper viscosity for applying the positive electrode slurry composition, so that a uniform electrode can be obtained. The content ratio of the positive electrode active material in the positive electrode active material layer is preferably 90 to 99.9% by mass, more preferably 95 to 99% by mass.

(Positive Electrode Binder)

As the positive electrode binder is not particularly limited, and known one can be used. For example, resins such as polyethylene, polytetrafluoroethylene (PTFE), polyvinylidene fluoride (PVDF), tetrafluoroethylene-hexafluoropropylene copolymers (FEP), polyacrylic acid derivatives and polyacrylonitrile derivatives, and soft polymers such as acryl-based soft polymers, diene-based soft polymers, olefin-based soft polymers and vinyl-based soft polymers. They may be used alone, or may be used in combination of two or more thereof.

The positive electrode may contain, in addition to the above-mentioned components, other components such as the foregoing electrolyte solution additive having a function to suppress of decomposition of an electrolyte solution. These components are not particularly limited as long as they do not affect the battery reaction.

(Electrolyte Solution)

While the electrolyte solution for use in the present invention is not particularly limited, for example, one obtained by dissolving a lithium salt in a nonaqueous solvent as a support electrolyte can be used. Examples of the lithium salt include lithium salts such as $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$ and $(C_2F_5SO_2)NLi$. Particularly, $LiPF_6$, $LiClO_4$ and $CF_3SO_3Li$ that are easily dissolved in a solvent and exhibit a high dissociation degree are suitably used. They may be used alone, or may be used in combination of two or more thereof. The amount of the support electrolyte is normally 1 to 30% by mass, preferably 5 to 20% by mass based on the amount of the electrolyte solution. When the amount of the support electrolyte is either excessively large or excessively small, the ion conductivity is reduced, so that the charge characteristic and discharge characteristic of the battery are deteriorated.

While the solvent to be used for the electrolyte solution is not particularly limited as long as it dissolves the support electrolyte, normally, alkyl carbonates such as dimethyl carbonate (DMC), ethylene carbonate (EC), diethyl carbonate (DEC), propylene carbonate (PC), butylene carbonate (BC) and methyl ethyl carbonate (MEC); esters such as γ-butyrolactone and methyl formate, ethers such as 1,2-dimethoxyethane and tetrahydrofuran; and sulfur-containing compounds such as sulfolane and dimethyl sulfoxide; are used. Particularly, dimethyl carbonate, ethylene carbonate, propylene carbonate, diethyl carbonate and methyl ethyl carbonate are preferred because they allow a high ion conductivity to be obtained and can be used over a wide temperature range. They may be used alone, or may be used in combination of two or more thereof. The electrolyte solution can also be used with an additive included therein. As the additive, a carbonate-based compound such as vinylene carbonate (VC) is preferred.

Examples of electrolyte solutions other than those described above may include gel-like polymer electrolytes obtained by impregnating a polymer electrolyte such as polyethylene oxide or polyacrylonitrile with an electrolyte solution, and inorganic solid electrolytes such as LiI and $Li_3N$.

(Separator)

As the separator, known one such as a microporous film or nonwoven fabric made of a polyolefin such as polyethylene or polypropylene or made of an aromatic polyamide resin; or a porous resin coat containing an inorganic ceramic powder can be used. Examples thereof include microporous films formed of resins such as polyolefins (polyethylene, polypropylene, polybutene and polyvinyl chloride) and mixtures or copolymers thereof; microporous films formed of resins such as polyethylene terephthalate, polycycloolefin, polyether sulfone, polyamide, polyimide, polyimideamide, polyaramid, polycycloolefin, nylon and polytetrafluoroethylene, or fabrics obtained by weaving polyolefin-based fibers, or nonwoven fabrics thereof, and aggregates of insulating substance particles.

The thickness of the separator is normally 0.5 to 40 μm, preferably 1 to 30 μm, further preferably 1 to 10 μm because resistance caused by separator within the battery is reduced and workability during preparation of the battery is improved.

(Method for Producing Lithium Ion Secondary Battery)

The method for producing the lithium ion secondary battery of the present invention is not particularly limited. For example, the above-described negative electrode and positive electrode are superimposed on each other with a separator interposed therebetween, this is wound or bent in conformity with the shape of a battery, and put in a battery container, and the battery container is injected with an electrolyte solution, and sealed. Further, an excessive current protection device such as an expand metal, a fuse or a PTC device, a lead plate or the like is included as necessary, so that an increase in pressure of the inside of the battery, and excessive charge-discharge can be prevented. The shape of the battery may be any of a laminate cell type, a coin type, a button type, a sheet type, a cylinder type, a rectangular shape and a flat type.

EXAMPLES

Hereinafter, the present invention will be described by way of examples, but the present invention is not limited to these examples. The "part(s)" and "%" in these examples are on a mass basis unless otherwise specified. In examples and comparative examples, measurement of a gel amount, measurement of a glass transition temperature, and assessment of initial swelling, swelling after cycle, a charge-discharge cycle characteristic, a charge-discharge rate characteristic and an adhesion characteristic were performed in the following manner.

(Measurement of Gel Amount)

A water dispersion containing various kinds of copolymer latexes was provided, and the water dispersion was dried under an environment of a humidity of 50% and a temperature of 23 to 25° C. to form a film with a thickness of 3±0.3 mm. The formed film was cut to a 3 mm square, and about 1 g of the film was precisely weighed. The mass of the film piece obtained by the cutting is defined as W0. This film piece was immersed in 100 g of tetrahydrofuran (THF) for 24 hours.

Thereafter, the film piece taken out from THF was dried in vacuum at 105° C. for 3 hours, and a mass W1 of an insoluble matter was measured. Then, a gel amount (%) was calculated in accordance with the following formula.

Gel amount (%)=$W1/W0 \times 100$ (Measurement of Glass Transition Temperature)

A water dispersion containing various kinds of copolymer latexes was provided, and the water dispersion was dried under an environment of a humidity of 50% and a temperature of 23 to 25° C. for 3 days to obtain a film. The film was dried in a hot air oven at 120° C. for 1 hour, and a strip having a thickness of 1.0±0.1 mm, a length of 50±2 mm and a width of 5±0.1 mm was then cut out from the film, and used as a test piece for dynamic viscoelasticity measurement. Using a viscoelasticity spectrometer (DMS) EXSTAR DMS5800 (manufactured by Seiko Instruments Inc.) as a dynamic viscoelasticity measurement device, measurement was performed under conditions of deformation mode: tension, frequency: 1 Hz, measurement temperature: −100° C. to 180° C. and temperature elevation rate: 3° C./minute to determine a storage elastic modulus, a loss elastic modulus and a tan δ, and the temperature at a peak top of the tan δ obtained at this time was defined as a glass transition temperature.

(Initial Swelling)

Charge-discharge operations were performed as follows: the laminate cell type lithium ion secondary battery prepared in each of examples and comparative examples was injected with a liquid, then left standing for 5 hours, charged to 4.2 V by a constant-current method at 0.2 C, and discharged to 3.0 V. Further, the battery was charged to 4.2 V at a 1 C rate. Thereafter, the cell in a charged state was disassembled, the negative electrode was taken out, a thickness ($d_1$) of the negative electrode (excluding the current collector) was measured, and a change ratio to a thickness ($d_0$) of the negative electrode (excluding the current collector) before preparation of the lithium ion secondary battery (initial swelling characteristic=$d_1/d_0 \times 100(\%)$) was determined, and assessed in accordance with the following criteria.

A: less than 30%

B: 30% or more to less than 35%

C: 35% or more to less than 40%

D: 40% or more

This value being smaller shows that initial swelling was more significantly suppressed. Evaluation results are shown in Tables 1 to 5.

(Swelling After Cycle)

Charge-discharge operations were performed as follows: the laminate cell type lithium ion secondary battery prepared in each of examples and comparative examples was injected with a liquid, then left standing for 5 hours, charged to 4.2 V by a constant-current method at 0.2 C, and discharged to 3.0 V. Further, 100-cycle charge-discharge operations were performed to 4.2 V at a 1 C rate. Thereafter, the cell after discharge was disassembled, the negative electrode was taken out, and a thickness ($d_2$) of the negative electrode (excluding the current collector) was measured. Then, a change ratio to a thickness ($d_0$) of a cell before preparation of the lithium ion secondary battery (swelling characteristic after cycle=$d_2/d_0 \times 100(\%)$) was determined, and assessed in accordance with the following criteria.

A: less than 10%

B: 10% or more to less than 15%

C: 15% or more to less than 20%

D: 20% or more

This value being smaller shows that swelling after cycle was more significantly suppressed. Evaluation results are shown in Tables 1 to 5.

(Charge-Discharge Cycle Characteristic)

Charge-discharge operations were performed as follows: the laminate cell type lithium ion secondary battery prepared in each of examples and comparative examples was injected with a liquid, then left standing for 5 hours, charged to 4.2 V by a constant-current method at 0.2 C, and discharged to 3.0 V. Further, 100-cycle charge-discharge operations were performed to 4.2 V at 0.5 C rate under an environment of 60° C. At this time, a capacity at the first cycle, i.e., an initial discharge capacity $C_1$, and a discharge capacity $C_2$ at the 100th cycle were measured. As a high-temperature cycle characteristic, a capacity change ratio shown by charge-discharge cycle characteristic=$C_2/C_1 \times 100(\%)$ was determined, and assessed in accordance with the following criteria.

A: 80% or more
B: 75% or more to less than 80%
C: 70% or more to less than 75%
D: less than 70%

This value being higher shows that the battery has a better high-temperature cycle characteristic. Evaluation results are shown in Tables 1 to 5.

(Discharge Rate Characteristic)

Charge-discharge operations were performed as follows: the laminate cell type lithium ion secondary battery prepared in each of examples and comparative examples was injected with a liquid, then left standing for 5 hours, charged to 4.2 V by a constant-current method at 0.2 C, and discharged to 3.0 V. Further, the battery was charged to 4.2 V at 0.2 C rate, and discharged at 0.2 C and 1.5 C rates. At this time, the discharge capacities at the discharge rates were defined as $C_{0.2}$ and $C_{1.5}$, respectively, and a capacity change ratio shown by discharge rate characteristic=$C_{1.5}/C_{0.2} \times 100(\%)$ was determined, and assessed in accordance with the following criteria.

A: 80% or more
B: 75% or more to less than 80%
C: 70% or more to less than 75%
D: less than 70%

This value being larger shows that the battery has a better charge-discharge rate characteristic. Evaluation results are shown in Tables 1 to 5.

(Adhesion Characteristic)

The negative electrode for the secondary battery produced in each of examples and comparative examples was cut to a 100 mm-long and 10 mm-wide rectangle as a test piece, a cellophane tape (one specified in JIS Z1522) was attached to an electrode composition layer surface with the electrode composition layer surface facing downward, one end of the current collector was pulled in a vertical direction at a tension speed of 50 mm/minute to peel off the tape, and a stress at this time was measured (the cellophane tape was fixed on a test table). The measurement was performed three times, an average thereof was determined and defined as a peel strength, and the peel strength was assessed in accordance with the following criteria.

A: 5 N/m or more
B: 4 N/m or more to less than 5 N/m
C: 3 N/m or more to less than 4 N/m
D: less than 3 N/m The peel strength being greater shows that the binding strength, i.e., adhesion strength, of the electrode composition layer to the current collector is greater. The evaluation results are shown in Tables 1 to 5.

Example 1

(Production of Binder Resin)
(Production of (A) Styrene-Butadiene Polymer Latex)

61.9 parts of styrene, 33.3 parts of 1,3-butadiene, 3.8 parts of itaconic acid as an ethylenically unsaturated carboxylic acid monomer, 0.95 parts of 2-hydroxyethyl acrylate as a hydroxyl group-containing monomer, 0.29 parts of t-dodecylmercaptan as a molecular weight modifier, 4.76 parts of sodium dodecylbenzenesulfonate as an emulsifier, 143 parts of ion-exchanged water and 0.95 parts of potassium persulfate as a polymerization initiator were added in a 5 MPa pressure resistant vessel with a stirrer, sufficiently stirred, and heated to 55° C. to start polymerization. At the time when the consumption amount of monomers reached 95.0%, cooling was performed to stop the reaction. A 5% aqueous sodium hydroxide solution was added to the water dispersion containing the polymer, so that pH was adjusted to 8. Then, unreacted monomers were removed by heating and distillation under reduced pressure. Thereafter, it was cooled to 30° C. or lower to obtain a water dispersion containing (A) a styrene-butadiene copolymer latex.

A film was prepared from the water dispersion by the above-mentioned method, and a gel amount and a glass transition temperature were measured. The results showed that the gel amount was 93% and the glass transition temperature (Tg) was 10° C.

(Production of (B) Polymer Latex)

21.7 parts of acrylonitrile, 40.4 parts of 1,3-butadiene, 0.19 parts of t-dodecylmercaptan as a molecular weight modifier, 3.1 parts of sodium dodecylbenzenesulfonate as an emulsifier, 93.2 parts of ion-exchanged water and 0.62 parts of potassium persulfate as a polymerization initiator were added in a 5 MPa pressure resistant vessel with a stirrer, sufficiently stirred, and heated to 55° C. to start polymerization of polymerization components that formed a core part. At the time when the consumption amount of the monomers reached 80.0%, a water dispersion obtained by mixing 16.8 parts of styrene, 9.3 parts of 1,3-butadiene, 9.9 parts of acrylonitrile, 0.62 parts of acrylic acid, 1.24 parts of itaconic acid as an ethylenically unsaturated carboxylic acid monomer, 0.19 parts of t-dodecylmercaptan as a molecular weight modifier, 3.1 parts of sodium dodecylbenzenesulfonate as an emulsifier, 93.2 parts of ion-exchanged water and 0.62 parts of potassium persulfate as a polymerization initiator beforehand was further added, and polymerization components that formed a shell part were polymerized. At the time when the total consumption amount of the added monomers reached 95.0%, cooling was performed to stop the reaction.

A 5% aqueous sodium hydroxide solution was added to the water dispersion containing the polymer, so that pH was adjusted to 8. Then, unreacted monomers were removed by heating and distillation under reduced pressure. Thereafter, the polymer was cooled to 30° C. or lower to obtain a water dispersion containing (B) a latex polymer. A film was prepared from the water dispersion by the above-mentioned method, and a gel amount and a glass transition temperature were measured. The results showed that the gel amount was 75%, the glass transition temperature (Tg) of core part was −37° C., and the glass transition temperature (Tg) of the shell part was 35° C. The ratio of the core to the shell in the obtained (B) polymer latex was 62.5/37.5 (core part/shell part) in terms of mass ratio.

(Silicon-Based Active Material $SiO_x$)

100 parts of silicon monoxide (manufactured by OSAKA Titanium technologies Co., Ltd.) and 20 parts of polyvinyl alcohol (reagent grade from Tokyo Chemical Industry Co., Ltd.) were added, and wet grinding and surface coating of particles were performed using a bead mill. Thereafter, the particles were dried in the form of a cake under a nitrogen atmosphere, then subjected to heat treatment at 950° C. under an argon atmosphere, and classified to prepare a carbon coat $SiO_x$ (x=1.1) of less than 325 mesh.

(Negative Electrode Slurry Composition)

95 parts of natural graphite as a carbon-based active material and 5 parts of the carbon coat $SiO_x$ as a silicon-based active material, 1 part of a binder resin ((A) styrene-butadiene copolymer latex:(B) polymer latex=100:10 (solid content mass ratio)), 1 part of a 1% aqueous solution of high-molecular-weight-type carboxymethyl cellulose (MAC 800LC manufactured by NIPPON PAPER Chemicals CO., LTD.) in terms of a solid content as a water-soluble polymer, and ion-exchanged water in such an amount as to achieve a total solid concentration of 52% were added in a planetary mixer, and mixed to prepare a negative electrode slurry composition.

(Negative Electrode)

The negative electrode slurry composition was applied onto a 20 μm-thick copper foil by a comma coater such that the coating amount was 11 to 12 mg/cm$^2$. Note that, the drying of the composition was performed by conveying the copper foil through the inside of an oven at 60° C. at a speed of 0.5 m/minute for 2 minutes. Thereafter, a heating treatment was performed at 120° C. for 2 minutes to obtain a negative electrode raw material. The raw material was pressed by a roll press machine such that the density was 1.50 to 1.60 g/cm$^3$, thereby obtaining a negative electrode.

(Positive Electrode)

100 parts of LiCoO$_2$ as a positive electrode active material, 2 parts of acetylene black (HS-100 manufactured by DENKI KAGAKU KOGYO KABUSHIKI KAISHA) as an electrical conductivity imparting material, 2 parts of PVDF (polyvinyl fluoride, KF-1100 manufactured by KUREHA CORPORATION), and 2-methylpyrrolidone in such an amount as to achieve a total solid concentration of 67% were added in a planetary mixer, and mixed to prepare a positive electrode slurry composition. The positive electrode slurry composition was applied onto a 20 μm-thick aluminum foil by a comma coater. Note that, the application of the composition was performed by conveying the aluminum foil through the inside of an oven at 60° C. at a speed of 0.5 m/minute for 2 minutes. Thereafter, a heating treatment was performed at 120° C. for 2 minutes to obtain a positive electrode raw material. The raw material was dried, and then pressed by a roll press machine such that the density after press was 3.40 to 3.50 g/cm$^3$, thereby obtaining a positive electrode raw material.

(Production of Lithium Ion Secondary Battery)

A single-layer polypropylene separator (width: 65 mm, length: 500 mm and thickness: 25 μm; produced by a dry method; porosity: 55%) was provided. The separator was cut to a square of 5×5 cm$^2$.

Subsequently, an aluminum package outer case was provided as an outer case of a battery. The positive electrode was cut to a square of 4×4 cm$^2$, and disposed such that a surface on the current collector side was in contact with the aluminum package outer case. The square separator prepared as described above was disposed on the surface of the positive electrode active material layer of the positive electrode. Further, the negative electrode was cut to a square of 4.2×4.2 cm$^2$, and disposed on the separator such that a surface on the negative electrode active material layer side faced the separator. This was filled with a LiPF6 solution in a concentration of 1.0 M (including a mixed solvent of EC/EMC=1/2 (volume ratio) as a solvent and 2% by volume (solvent ratio) of vinylene carbonate as an additive) as an electrolyte solution. Further, for sealing the opening of the aluminum package, heat sealing was performed at 150° C. to close the aluminum outer case, thereby producing a lithium ion secondary battery. The obtained evaluation results are shown in Table 1.

Example 2

A lithium ion secondary battery was produced in the same manner as in Example 1 except that the composition of the binder resin in preparation of the negative electrode slurry composition was changed to (A) styrene-butadiene copolymer latex:(B) polymer latex=100:5 (solid content mass ratio).

Example 3

A lithium ion secondary battery was produced in the same manner as in Example 1 except that the composition of the binder resin in preparation of the negative electrode slurry composition was changed to (A) styrene-butadiene copolymer latex:(B) polymer latex=100:30 (solid content mass ratio).

Example 4

A lithium ion secondary battery was produced in the same manner as in Example 1 except that the composition of the binder resin in preparation of the negative electrode slurry composition was changed to (A) styrene-butadiene copolymer latex:(B) polymer latex=100:50 (solid content mass ratio).

Example 5

A lithium ion secondary battery was produced in the same manner as in Example 1 except that as the negative electrode active material, a negative electrode active material was prepared so as to contain 15 parts of the carbon coat SiO$_x$ as a silicon-based active material based on 85 parts of natural graphite as a carbon-based active material.

Example 6

A lithium ion secondary battery was produced in the same manner as in Example 1 except that as the negative electrode active material, a negative electrode active material was prepared so as to contain 30 parts of the carbon coat SiO$_x$ as a silicon-based active material based on 70 parts of natural graphite as a carbon-based active material.

Example 7

A lithium ion secondary battery was produced in the same manner as in Example 6 except that the amount of the binder resin used in preparation of the negative electrode slurry composition was changed to 2 parts based on 100 parts of the negative electrode active material.

Example 8

A lithium ion secondary battery was produced in the same manner as in Example 1 except that as the negative electrode active material, a negative electrode active material was prepared so as to contain 50 parts of the carbon coat SiO$_x$ as a silicon-based active material based on 50 parts of natural graphite as a carbon-based active material.

Example 9

A lithium ion secondary battery was produced in the same manner as in Example 8 except that the amount of the binder resin in preparation of the negative electrode slurry composition was changed to 3 parts based on 100 parts of the negative electrode active material.

Example 10

(A) a styrene-butadiene copolymer latex having a gel amount of 75% and a glass transition temperature (Tg) of 10° C. was obtained in the same manner as in production of the (A) styrene-butadiene polymer latex in Example 1 except that the amount of t-dodecylmercaptan as a molecular weight modifier was changed to 0.4 parts. The subsequent operations were performed in the same manner as in Example 1 to produce a lithium ion secondary battery.

Example 11

(A) a styrene-butadiene copolymer latex having a gel amount of 93% and a glass transition temperature (Tg) of −10° C. was obtained in the same manner as in production of the (A) styrene-butadiene polymer latex in Example 1 except that the amount of styrene was changed to 52.4 parts and the amount of 1,3-butadiene was changed to 42.9 parts. The subsequent operations were performed in the same manner as in Example 1 to produce a lithium ion secondary battery.

Example 12

(A) a styrene-butadiene copolymer latex having a gel amount of 93% and a glass transition temperature (Tg) of 30° C. was obtained in the same manner as in production of the (A) styrene-butadiene polymer latex in Example 1 except that the amount of styrene was changed to 71.4 parts and the amount of 1,3-butadiene was changed to 23.8 parts. The subsequent operations were performed in the same manner as in Example 1 to produce a lithium ion secondary battery.

Example 13

A polymer latex having a gel amount of 75%, a glass transition temperature (Tg) of −40° C. at a core part and a glass transition temperature (Tg) of 45° C. at a shell part in the same manner as in production of the (B) polymer latex in Example 1 except that polymerization was performed while the amounts of polymerization components that formed a core part were changed to 20.5 parts for acrylonitrile and 41.6 parts for 1,3-butadiene, and polymerization was performed while the amounts of polymerization components that formed a shell part were changed to 18.0 parts for styrene and 8.1 parts for 1,3-butadiene. The subsequent operations were performed in the same manner as in Example 1 to produce a lithium ion secondary battery.

Example 14

A polymer latex having a gel amount of 75%, a glass transition temperature (Tg) of −10° C. at a core part and a glass transition temperature (Tg) of 25° C. at a shell part in the same manner as in production of the (B) polymer latex in Example 1 except that polymerization was performed while the amounts of polymerization components that formed a core part were changed to 31.1 parts for acrylonitrile and 31.1 parts for 1,3-butadiene, and polymerization was performed while the amounts of polymerization components that formed a shell part were changed to 14.3 parts for styrene and 11.8 parts for 1,3-butadiene. The subsequent operations were performed in the same manner as in Example 1 to produce a lithium ion secondary battery.

Example 15

A polymer latex having a gel amount of 75%, a glass transition temperature (Tg) of −40° C. at a core part and a glass transition temperature (Tg) of 25° C. at a shell part in the same manner as in production of the (B) polymer latex in Example 1 except that polymerization was performed while the amounts of polymerization components that formed a core part were changed to 20.5 parts for acrylonitrile and 41.6 parts for 1,3-butadiene, and polymerization was performed while the amounts of polymerization components that formed a shell part were changed to 14.3 parts for styrene and 11.8 parts for 1,3-butadiene. The subsequent operations were performed in the same manner as in Example 1 to produce a lithium ion secondary battery.

Example 16

A polymer latex having a gel amount of 75%, a glass transition temperature (Tg) of −10° C. at a core part and a glass transition temperature (Tg) of 45° C. at a shell part in the same manner as in production of the (B) polymer latex in Example 1 except that polymerization was performed while the amounts of polymerization components that formed a core part were changed to 31.1 parts for acrylonitrile and 31.1 parts for 1,3-butadiene, and polymerization was performed while the amounts of polymerization components that formed a shell part were changed to 18.0 parts for styrene and 8.1 parts for 1,3-butadiene. The subsequent operations were performed in the same manner as in Example 1 to produce a lithium ion secondary battery.

Example 17

A polymer latex having a gel amount of 75%, a glass transition temperature (Tg) of −37° C. at a core part and a glass transition temperature (Tg) of 35° C. at a shell part in the same manner as in production of the (B) polymer latex in Example 1 except that polymerization was performed while the amounts of polymerization components that formed a core part were changed to 21.7 parts for acrylonitrile and 40.4 parts for 1,3-butadiene, and polymerization was performed while the amounts of polymerization components that formed a shell part were changed to 16.1 parts for styrene and 9.9 parts for 1,3-butadiene. The subsequent operations were performed in the same manner as in Example 1 to produce a lithium ion secondary battery.

Example 18

A lithium ion secondary battery was produced in the same manner as in Example 1 except that the type of the water-soluble polymer used for preparation of the negative electrode slurry composition was changed to polystyrenesulfonic acid PS-100 (TOSOH ORGANIC CHEMICAL CO., LTD.).

Example 19

40 parts of butyl acrylate, 20 parts of ethyl acrylate, 10 parts of 2,2,2-trifluoroethyl methacrylate, 20 parts of methacrylic acid as an ethylenically unsaturated carboxylic acid monomer, 10 parts of 2-acrylamide-2-methylpropanesulfonic acid as an ethylenically unsaturated sulfonic acid monomer, 4 parts of sodium dodecylbenzenesulfonate as an emulsifier, 150 parts of ion-exchanged water as a solvent, and 0.5 parts of potassium persulfate as a polymerization initiator were added in a 5 MPa pressure resistant vessel with a stirrer, sufficiently stirred, and heated to 60° C. to start polymerization.

At the time when the polymerization conversion ratio reached 96%, cooling was performed to stop the reaction, thereby obtaining a mixture containing a water-soluble fluorine-based polymer. A 5% aqueous sodium hydroxide solution was added to the mixture containing a water-soluble polymer, so that pH was adjusted to 8, thereby obtaining a water-soluble fluorine-based polymer (abbreviated as WP).

A lithium ion secondary battery was produced in the same manner as in Example 1 except that the type of the water-soluble polymer used for preparation of the negative electrode slurry composition was changed to the fluorine-based polymer (WP).

Example 20

A lithium ion secondary battery was produced in the same manner as in Example 1 except that as the water-soluble polymer used for preparation of the negative electrode slurry composition, 0.9 parts of high-molecular-weight-type CMC (MAC 800LC) and 0.1 part of the water-soluble fluorine-based polymer (WP) were used in combination.

Example 21

100 parts of silicon monoxide (manufactured by OSAKA Titanium technologies Co., Ltd.) and 8 parts of polyvinyl alcohol (reagent grade from Tokyo Chemical Industry Co., Ltd.) were added, and wet grinding and surface coating of particles were performed using a bead mill. Thereafter, the particles were dried in the form of a cake under a nitrogen atmosphere, then subjected to heat treatment at 500° C. under an argon atmosphere, and classified to prepare a carbon coat SiO of less than 325 mesh.

A lithium ion secondary battery was produced in the same manner as in Example 1 except that the carbon coat SiO was used as a silicon-based active material.

Example 22

A lithium ion secondary battery was produced in the same manner as in Example 21 except that as the negative electrode active material, a negative electrode active material was prepared so as to contain 15 parts of the carbon coat SiO as a silicon-based active material based on 85 parts of natural graphite as a carbon-based active material, and the amount of the binder resin in preparation of the negative electrode slurry composition was changed to 2 parts based on 100 parts of the negative electrode active material.

Example 23

A lithium ion secondary battery was produced in the same manner as in Example 21 except that a negative electrode active material was prepared so as to contain 30 parts of the carbon coat SiO as a silicon-based active material based on 70 parts of natural graphite as a carbon-based active material contained in the negative electrode active material, and the amount of the binder resin in preparation of the negative electrode slurry composition was changed to 3 parts based on 100 parts of the negative electrode active material.

Example 24

98 parts of silicon monoxide (manufactured by OSAKA Titanium technologies Co., Ltd.), 20 parts of natural graphite and 2 parts of polyvinyl alcohol (reagent grade from Tokyo Chemical Industry Co., Ltd.) were added, and wet grinding and surface coating of particles were performed using a bead mill. Thereafter, the particles were dried in the form of a cake under a nitrogen atmosphere, then subjected to heat treatment at 120° C. under an argon atmosphere, and classified to prepare SiO—C of less than 325 mesh.

A lithium ion secondary battery was produced in the same manner as in Example 1 except that the SiO—C was used as a silicon-based active material.

Example 25

A lithium ion secondary battery was produced in the same manner as in Example 24 except that as the negative electrode active material, a negative electrode active material was prepared so as to contain 15 parts of SiO—C as a silicon-based active material based on 85 parts of natural graphite as a carbon-based active material, and the amount of the binder resin in preparation of the negative electrode slurry composition was changed to 2 parts based on 100 parts of the negative electrode active material.

Example 26

A lithium ion secondary battery was produced in the same manner as in Example 24 except that as the negative electrode active material, a negative electrode active material was prepared so as to contain 30 parts of SiO—C as a silicon-based active material based on 70 parts of natural graphite as a carbon-based active material, and the amount of the binder resin in preparation of the negative electrode slurry composition was changed to 3 parts based on 100 parts of the negative electrode active material.

Example 27

50 parts of natural graphite and 8 parts of polyvinyl alcohol (reagent grade from Tokyo Chemical Industry Co., Ltd.) were added to 42 parts of Si (reagent manufactured by JAPAN PURE CHEMICAL CO., LTD.), and were subjected to disperse and mix by a Henschel mixer, degassed and dried, and classified to prepare Si—C of less than 325 mesh.

A lithium ion secondary battery was produced in the same manner as in Example 24 except that the Si—C was used as a silicon-based active material.

Example 28

A lithium ion secondary battery was produced in the same manner as in Example 27 except that as the negative electrode active material, a negative electrode active material was prepared so as to contain 15 parts of Si—C as a silicon-based active material based on 85 parts of natural graphite as a carbon-based active material, and the amount of the binder resin in preparation of the negative electrode slurry composition was changed to 2 parts based on 100 parts of the negative electrode active material.

Example 29

A lithium ion secondary battery was produced in the same manner as in Example 27 except that as the negative electrode active material, a negative electrode active material was prepared so as to contain 30 parts of SiO—C as a silicon-based active material based on 70 parts of natural graphite as a carbon-based active material, and the amount of the binder resin in preparation of the negative electrode slurry composition was changed to 3 parts based on 100 parts of the negative electrode active material.

Example 30

A lithium ion secondary battery was produced in the same manner as in Example 1 except that the Si (reagent manufactured by JAPAN PURE CHEMICAL CO., LTD.) was used as a silicon-based active material.

Example 31

A lithium ion secondary battery was produced in the same manner as in Example 30 except that as the negative electrode active material, a negative electrode active material was prepared so as to contain 15 parts of the Si as a silicon-based active material based on 85 parts of natural graphite as a carbon-based active material, and the amount of the binder resin in preparation of the negative electrode slurry composition was changed to 2 parts based on 100 parts of the negative electrode active material.

Example 32

A lithium ion secondary battery was produced in the same manner as in Example 30 except that as the negative electrode active material, a negative electrode active material was prepared so as to contain 30 parts of the Si as a silicon-based active material based on 70 parts of natural graphite as a carbon-based active material, and the amount of the binder resin in preparation of the negative electrode slurry composition was changed to 3 parts based on 100 parts of the negative electrode active material.

Example 33

(A) a styrene-butadiene copolymer latex having a gel amount of 75% and a glass transition temperature (Tg) of −10° C. was obtained in the same manner as in production of the (A) styrene-butadiene polymer latex in Example 1 except that the amount of styrene was changed to 52.4 parts, the amount of 1,3-butadiene was changed to 42.9 parts, and the amount of t-dodecylmercaptan as a molecular weight modifier was changed to 0.38 parts. The subsequent operations were performed in the same manner as in Example 1 to produce a lithium ion secondary battery.

Example 34

(A) a styrene-butadiene copolymer latex having a gel amount of 75% and a glass transition temperature (Tg) of 30° C. was obtained in the same manner as in production of the (A) styrene-butadiene polymer latex in Example 1 except that the amount of styrene was changed to 71.4 parts, the amount of 1,3-butadiene was changed to 23.8 parts, and the amount of t-dodecylmercaptan as a molecular weight modifier was changed to 0.38 parts. The subsequent operations were performed in the same manner as in Example 1 to produce a lithium ion secondary battery.

Example 35

(A) a styrene-butadiene copolymer latex having a gel amount of 75% and a glass transition temperature (Tg) of 50° C. was obtained in the same manner as in production of the (A) styrene-butadiene polymer latex in Example 1 except that the amount of styrene was changed to 81.0 parts, the amount of 1,3-butadiene was changed to 14.3 parts, and the amount of t-dodecylmercaptan as a molecular weight modifier was changed to 0.38 parts. The subsequent operations were performed in the same manner as in Example 1 to produce a lithium ion secondary battery.

Example 36

(A) a styrene-butadiene copolymer latex having a gel amount of 93% and a glass transition temperature (Tg) of 50° C. was obtained in the same manner as in production of the (A) styrene-butadiene polymer latex in Example 1 except that the amount of styrene was changed to 81.0 parts and the amount of 1,3-butadiene was changed to 14.3 parts. The subsequent operations were performed in the same manner as in Example 1 to produce a lithium ion secondary battery.

Example 37

(A) a styrene-butadiene copolymer latex having a gel amount of 95% and a glass transition temperature (Tg) of −10° C. was obtained in the same manner as in production of the (A) styrene-butadiene polymer latex in Example 1 except that the amount of styrene was changed to 52.4 parts, the amount of 1,3-butadiene was changed to 42.9 parts, and the amount of t-dodecylmercaptan as a molecular weight modifier was changed to 0.24 parts. The subsequent operations were performed in the same manner as in Example 1 to produce a lithium ion secondary battery.

Example 38

(A) a styrene-butadiene copolymer latex having a gel amount of 95% and a glass transition temperature (Tg) of 10° C. was obtained in the same manner as in production of the (A) styrene-butadiene polymer latex in Example 1 except that the amount of t-dodecylmercaptan as a molecular weight modifier was changed to 0.24 parts. The subsequent operations were performed in the same manner as in Example 1 to produce a lithium ion secondary battery.

Example 39

(A) a styrene-butadiene copolymer latex having a gel amount of 95% and a glass transition temperature (Tg) of 30° C. was obtained in the same manner as in production of the (A) styrene-butadiene polymer latex in Example 1 except that the amount of styrene was changed to 71.4 parts, the amount of 1,3-butadiene was changed to 23.8 parts, and the amount of t-dodecylmercaptan as a molecular weight modifier was changed to 0.24 parts. The subsequent operations were performed in the same manner as in Example 1 to produce a lithium ion secondary battery.

Example 40

(A) a styrene-butadiene copolymer latex having a gel amount of 95% and a glass transition temperature (Tg) of 50° C. was obtained in the same manner as in production of the (A) styrene-butadiene polymer latex in Example 1 except that the amount of styrene was changed to 81.0 parts, the amount of 1,3-butadiene was changed to 14.3 parts, and the amount of t-dodecylmercaptan as a molecular weight modifier was changed to 0.24 parts. The subsequent operations were performed in the same manner as in Example 1 to produce a lithium ion secondary battery.

Example 41

A polymer latex having a gel amount of 75%, a glass transition temperature (Tg) of −50° C. at a core part and a glass transition temperature (Tg) of 45° C. at a shell part in the same manner as in production of the (B) polymer latex in Example 1 except that polymerization was performed while the amounts of polymerization components that formed a core part were changed to 16.1 parts for acrylonitrile and 46.0 parts for 1,3-butadiene, and polymerization was performed while the amounts of polymerization components that formed a shell part were changed to 18.0 parts for styrene and 8.1 parts for 1,3-butadiene. The subsequent operations were performed in the same manner as in Example 1 to produce a lithium ion secondary battery.

Example 42

A polymer latex having a gel amount of 75%, a glass transition temperature (Tg) of −50° C. at a core part and a glass transition temperature (Tg) of 25° C. at a shell part in the same manner as in production of the (B) polymer latex in Example 1 except that polymerization was performed while the amounts of polymerization components that formed a core part were changed to 16.1 parts for acrylonitrile and 46.0 parts for 1,3-butadiene, and polymerization was performed while the amounts of polymerization components that formed a shell part were changed to 14.3 parts for styrene and 11.8 parts for 1,3-butadiene. The subsequent operations were performed in the same manner as in Example 1 to produce a lithium ion secondary battery.

Example 43

A polymer latex having a gel amount of 75%, a glass transition temperature (Tg) of 10° C. at a core part and a glass transition temperature (Tg) of 25° C. at a shell part in the same manner as in production of the (B) polymer latex in Example 1 except that polymerization was performed while the amounts of polymerization components that formed a core part were changed to 37.9 parts for acrylonitrile and 24.2 parts for 1,3-butadiene, and polymerization was performed while the amounts of polymerization components that formed a shell part were changed to 14.3 parts for styrene and 11.8 parts for 1,3-butadiene. The subsequent operations were performed in the same manner as in Example 1 to produce a lithium ion secondary battery.

Example 44

A polymer latex having a gel amount of 75%, a glass transition temperature (Tg) of 10° C. at a core part and a glass transition temperature (Tg) of 45° C. at a shell part in the same manner as in production of the (B) polymer latex in Example 1 except that polymerization was performed while the amounts of polymerization components that formed a core part were changed to 37.9 parts for acrylonitrile and 24.2 parts for 1,3-butadiene, and polymerization was performed while the amounts of polymerization components that formed a shell part were changed to 18.0 parts for styrene and 8.1 parts for 1,3-butadiene. The subsequent operations were performed in the same manner as in Example 1 to produce a lithium ion secondary battery.

Example 45

A polymer latex having a gel amount of 75%, a glass transition temperature (Tg) of −50° C. at a core part and a glass transition temperature (Tg) of 60° C. at a shell part in the same manner as in production of the (B) polymer latex in Example 1 except that polymerization was performed while the amounts of polymerization components that formed a core part were changed to 16.1 parts for acrylonitrile and 46.0 parts for 1,3-butadiene, and polymerization was performed while the amounts of polymerization components that formed a shell part were changed to 21.1 parts for styrene and 6.2 parts for 1,3-butadiene. The subsequent operations were performed in the same manner as in Example 1 to produce a lithium ion secondary battery.

Example 46

A polymer latex having a gel amount of 75%, a glass transition temperature (Tg) of −50° C. at a core part and a glass transition temperature (Tg) of 15° C. at a shell part in the same manner as in production of the (B) polymer latex in Example 1 except that polymerization was performed while the amounts of polymerization components that formed a core part were changed to 16.1 parts for acrylonitrile and 46.0 parts for 1,3-butadiene, and polymerization was performed while the amounts of polymerization components that formed a shell part were changed to 13.7 parts for styrene and 13.7 parts for 1,3-butadiene. The subsequent operations were performed in the same manner as in Example 1 to produce a lithium ion secondary battery.

Example 47

A polymer latex having a gel amount of 75%, a glass transition temperature (Tg) of −37° C. at a core part and a glass transition temperature (Tg) of 60° C. at a shell part in the same manner as in production of the (B) polymer latex in Example 1 except that polymerization was performed while the amounts of polymerization components that formed a shell part were changed to 21.1 parts for styrene and 6.2 parts for 1,3-butadiene. The subsequent operations were performed in the same manner as in Example 1 to produce a lithium ion secondary battery.

Example 48

A polymer latex having a gel amount of 75%, a glass transition temperature (Tg) of −37° C. at a core part and a glass transition temperature (Tg) of 15° C. at a shell part in the same manner as in production of the (B) polymer latex in Example 1 except that polymerization was performed while the amounts of polymerization components that formed a shell part were changed to 13.7 parts for styrene and 13.7 parts for 1,3-butadiene. The subsequent operations were performed in the same manner as in Example 1 to produce a lithium ion secondary battery.

Comparative Example 1

(A) a styrene-butadiene copolymer latex having a gel amount of 60% and a glass transition temperature (Tg) of 10° C. was obtained in the same manner as in production of the (A) styrene-butadiene polymer latex in Example 1 except that the amount of t-dodecylmercaptan as a molecular weight modifier was changed to 0.67 parts, and polymerization was performed at 50° C. The subsequent operations were performed in the same manner as in Example 1 to produce a lithium ion secondary battery.

Comparative Example 2

(A) a styrene-butadiene copolymer latex having a gel amount of 93% and a glass transition temperature (Tg) of 70° C. was obtained in the same manner as in production of the (A) styrene-butadiene polymer latex in Example 1 except that the amount of styrene was changed to 85.7 parts and the amount of 1,3-butadiene was changed to 9.5 parts. The subsequent operations were performed in the same manner as in Example 1 to produce a lithium ion secondary battery.

Comparative Example 3

(A) a styrene-butadiene copolymer latex having a gel amount of 93% and a glass transition temperature (Tg) of −40° C. was obtained in the same manner as in production of the (A) styrene-butadiene polymer latex in Example 1 except that the amount of styrene was changed to 33.3 parts and the amount of 1,3-butadiene was changed to 61.9 parts. The subsequent operations were performed in the same manner as in Example 1 to produce a lithium ion secondary battery.

Comparative Example 4

21.7 parts of acrylonitrile, 40.4 parts of 1,3-butadiene, 0.19 parts of t-dodecylmercaptan as a molecular weight modifier, 3.1 parts of sodium dodecylbenzenesulfonate as an emulsifier, 93.2 parts of ion-exchanged water and 0.62 parts of potassium persulfate as a polymerization initiator were added in a 5 MPa pressure resistant vessel with a stirrer, sufficiently stirred, and heated to 55° C. to start polymerization of polymerization components that formed a core part. At the time when the total consumption amount of the added monomers reached 95.0%, cooling was performed to stop the reaction. A 5% aqueous sodium hydroxide solution was added to the water dispersion containing the polymer, so that pH was adjusted to 8.

Then, unreacted monomers were removed by heating and distillation under reduced pressure. Thereafter, it was cooled to 30° C. or lower to obtain a water dispersion containing a latex polymer. A film was prepared from the water dispersion by the above-mentioned method, and a gel amount and a glass transition temperature were measured. The results showed that the gel amount was 75% and the glass transition temperature (Tg) was −37° C. with a single peak.

A lithium ion secondary battery was produced in the same manner as in Example 1 except that the above-mentioned latex was used as the (B) polymer latex.

Comparative Example 5

A water dispersion obtained by mixing 16.8 parts of styrene, 9.3 parts of 1,3-butadiene, 9.9 parts of acrylonitrile, 0.62 parts of acrylic acid, 1.2 parts of itaconic acid as an ethylenically unsaturated carboxylic acid monomer, 0.19 parts of t-dodecylmercaptan as a molecular weight modifier, 3.1 parts of sodium dodecylbenzenesulfonate as an emulsifier, 93.2 parts of ion-exchanged water and 0.62 parts of potassium persulfate as a polymerization initiator was added, and polymerization components that formed a shell part were polymerized. At the time when the total consumption amount of the added monomers reached 95.0%, cooling was performed to stop the reaction. A 5% aqueous sodium hydroxide solution was added to the water dispersion containing the polymer, so that pH was adjusted to 8. Then, unreacted monomers were removed by heating and distillation under reduced pressure. Thereafter, it was cooled to 30° C. or lower to obtain a water dispersion containing a latex polymer. A film was prepared from the water dispersion by the above-mentioned method, and a gel amount and a glass transition temperature were measured. The results showed that the gel amount was 75% and the glass transition temperature (Tg) was 35° C. with a single peak.

A lithium ion secondary battery was produced in the same manner as in Example 1 except that the above-mentioned latex was used as the (B) polymer latex.

Comparative Example 6

A lithium ion secondary battery was produced in the same manner as in Example 1 except that the (B) polymer latex was not used.

Comparative Example 7

A lithium ion secondary battery was produced in the same manner as in Example 1 except that the (A) styrene-butadiene copolymer latex was not used.

Comparative Example 8

(A) a styrene-butadiene copolymer latex having a gel amount of 65% and a glass transition temperature (Tg) of 10° C. was obtained in the same manner as in production of the (A) styrene-butadiene polymer latex in Example 1 except that the amount of t-dodecylmercaptan as a molecular weight modifier was changed to 0.52 parts, and polymerization was performed at 50° C. The subsequent operations were performed in the same manner as in Example 1 to produce a lithium ion secondary battery.

Comparative Example 9

(A) a styrene-butadiene copolymer latex having a gel amount of 75% and a glass transition temperature (Tg) of 70° C. was obtained in the same manner as in production of the (A) styrene-butadiene polymer latex in Example 1 except that the amount of styrene was changed to 85.7 parts, the amount of 1,3-butadiene was changed to 9.5 parts, and the amount of t-dodecylmercaptan as a molecular weight modifier was changed to 0.38 parts. The subsequent operations were performed in the same manner as in Example 1 to produce a lithium ion secondary battery.

Comparative Example 10

(A) a styrene-butadiene copolymer latex having a gel amount of 75% and a glass transition temperature (Tg) of −40° C. was obtained in the same manner as in production of the (A) styrene-butadiene polymer latex in Example 1 except that the amount of styrene was changed to 33.3 parts, the amount of 1,3-butadiene was changed to 61.9 parts, and the amount of t-dodecylmercaptan as a molecular weight modifier was changed to 0.38 parts. The subsequent operations were performed in the same manner as in Example 1 to produce a lithium ion secondary battery.

Comparative Example 11

(A) a styrene-butadiene copolymer latex having a gel amount of 99% and a glass transition temperature (Tg) of 10° C. was obtained in the same manner as in production of the (A) styrene-butadiene polymer latex in Example 1 except that the amount of t-dodecylmercaptan as a molecular weight modifier was changed to 0.14 parts. The subsequent operations were performed in the same manner as in Example 1 to produce a lithium ion secondary battery.

Comparative Example 12

(A) a styrene-butadiene copolymer latex having a gel amount of 99% and a glass transition temperature (Tg) of −40° C. was obtained in the same manner as in production of the (A) styrene-butadiene polymer latex in Example 1 except that the amount of styrene was changed to 33.3 parts, the amount of 1,3-butadiene was changed to 61.9 parts, and the amount of t-dodecylmercaptan as a molecular weight modifier was changed to 0.14 parts. The subsequent operations were performed in the same manner as in Example 1 to produce a lithium ion secondary battery.

Comparative Example 13

(A) a styrene-butadiene copolymer latex having a gel amount of 99% and a glass transition temperature (Tg) of 70° C. was obtained in the same manner as in production of the (A) styrene-butadiene polymer latex in Example 1 except that the amount of styrene was changed to 85.7 parts, the amount of 1,3-butadiene was changed to 9.5 parts, and the amount of t-dodecylmercaptan as a molecular weight modifier was changed to 0.14 parts. The subsequent operations were performed in the same manner as in Example 1 to produce a lithium ion secondary battery.

TABLE 1

| | | Ex. 1 | Ex. 2 | Ex. 3 | Ex. 4 | Ex. 5 | Ex. 6 |
|---|---|---|---|---|---|---|---|
| (A) styrene-butadiene copolymer latex | Gel amount (%) | 93 | 93 | 93 | 93 | 93 | 93 |
| | Glass transition temperature (° C.) | 10 | 10 | 10 | 10 | 10 | 10 |
| | Styrene/butadiene composition ratio | 65/35 | 65/35 | 65/35 | 65/35 | 65/35 | 65/35 |
| (B) polymer latex | Glass transition temperature (core part) (° C.) | −37 | −37 | −37 | −37 | −37 | −37 |
| | Glass transition temperature (shell part) (° C.) | 35 | 35 | 35 | 35 | 35 | 35 |
| | Amount of (B) (vs. 100 parts of (A)) | 10 | 5 | 30 | 50 | 10 | 10 |
| Amount of binder resin (vs. 100 parts of negative electrode active material) | | 1 | 1 | 1 | 1 | 1 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) |
| | Amount of water-soluble polymer (vs. 100 parts of negative electrode active material) | 1 | 1 | 1 | 1 | 1 | 1 |
| Negative electrode active material | Type of silicon-based active material and silicon | $SiO_x$(Carbon coat) | $SiO_x$(Carbon coat) | $SiO_x$(Carbon coat) | $SiO_x$(Carbon coat) | $SiO_x$(Carbon coat) | $SiO_x$(Carbon coat) |
| | Blending ratio of carbon-based active material/silicon-based active material | 95/5 | 95/5 | 95/5 | 95/5 | 85/15 | 70/30 |
| Evaluation | Initial swelling | A | B | B | C | B | B |
| | Swelling after cycle | A | A | B | C | A | B |
| | Cycle characteristic | A | A | A | B | A | A |
| | Rate characteristic | A | A | A | B | A | A |
| | Adhesion | A | A | A | A | A | A |

| | | Ex. 7 | Ex. 8 | Ex. 9 | Ex. 10 | Ex. 11 | Ex. 12 |
|---|---|---|---|---|---|---|---|
| (A) styrene-butadiene copolymer latex | Gel amount (%) | 93 | 93 | 93 | 75 | 93 | 93 |
| | Glass transition temperature (° C.) | 10 | 10 | 10 | 10 | −10 | 30 |
| | Styrene/butadiene composition ratio | 65/35 | 65/35 | 65/35 | 65/35 | 55/45 | 75/25 |
| (B) polymer latex | Glass transition temperature (core part) (° C.) | −37 | −37 | −37 | −37 | −37 | −37 |
| | Glass transition temperature (shell part) (° C.) | 35 | 35 | 35 | 35 | 35 | 35 |
| | Amount of (B) (vs. 100 parts of (A)) | 10 | 10 | 10 | 10 | 10 | 10 |
| Amount of binder resin (vs. 100 parts of negative electrode active material) | | 2 | 1 | 3 | 1 | 1 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) |
| | Amount of water-soluble polymer (vs. 100 parts of negative electrode active material) | 1 | 1 | 1 | 1 | 1 | 1 |

TABLE 1-continued

| | | | | | | | |
|---|---|---|---|---|---|---|---|
| Negative electrode active material | Type of silicon-based active material and silicon | SiO$_x$(Carbon coat) | SiO$_x$(Carbon coat) | SiO$_x$(Carbon coat) | SiO$_x$(Carbon coat) | SiO$_x$(Carbon coat) | SiO$_x$(Carbon coat) |
| | Blending ratio of carbon-based active material/silicon-based active material | 70/30 | 50/50 | 50/50 | 95/5 | 95/5 | 95/5 |
| Evaluation | Initial swelling | B | C | C | C | B | B |
| | Swelling after cycle | A | C | C | C | A | A |
| | Cycle characteristic | A | B | B | B | A | A |
| | Rate characteristic | A | B | B | B | A | A |
| | Adhesion | A | B | A | A | A | A |

TABLE 2

| | | Ex. 13 | Ex. 14 | Ex. 15 | Ex. 16 | Ex. 17 | Ex. 18 |
|---|---|---|---|---|---|---|---|
| (A) styrene-butadiene copolymer latex | Gel amount (%) | 93 | 93 | 93 | 93 | 93 | 93 |
| | Glass transition temperature (° C.) | 10 | 10 | 10 | 10 | 10 | 10 |
| | Styrene/butadiene composition ratio | 65/35 | 65/35 | 65/35 | 65/35 | 65/35 | 65/35 |
| (B) polymer latex | Glass transition temperature (core part) (° C.) | −40 | −10 | −40 | −10 | −37 | −37 |
| | Glass transition temperature (shell part) (° C.) | 45 | 25 | 25 | 45 | 35 | 35 |
| | Amount of (B) (vs. 100 parts of (A)) | 10 | 10 | 10 | 10 | 10 | 10 |
| Amount of binder resin (vs. 100 parts of negative electrode active material) | | 1 | 1 | 1 | 1 | 1 | 1 |
| Water-soluble polymer | Type | CMC (MAC800LC) | CMC (MAC800LC) | CMC (MAC800LC) | CMC (MAC800LC) | CMC (MAC350) | Sulfonic acid-based |
| | Amount of water-soluble polymer (vs. 100 parts of negative electrode active material) | 1 | 1 | 1 | 1 | 1 | 1 |
| Negative electrode active material | Type of silicon-based active material and silicon | SiO$_x$(Carbon coat) | SiO$_x$(Carbon coat) | SiO$_x$(Carbon coat) | SiO$_x$(Carbon coat) | SiO$_x$(Carbon coat) | SiO$_x$(Carbon coat) |
| | Blending ratio of carbon-based active material/silicon-based active material | 95/5 | 95/5 | 95/5 | 95/5 | 95/5 | 95/5 |
| Evaluation | Initial swelling | B | B | B | B | B | B |
| | Swelling after cycle | A | A | A | A | B | A |
| | Cycle characteristic | A | A | A | A | A | A |
| | Rate characteristic | A | A | A | A | A | A |
| | Adhesion | A | A | A | A | A | A |

| | | Ex. 19 | Ex. 20 | Ex. 21 | Ex. 22 | Ex. 23 | Ex. 24 |
|---|---|---|---|---|---|---|---|
| (A) styrene-butadiene copolymer latex | Gel amount (%) | 93 | 93 | 93 | 93 | 93 | 93 |
| | Glass transition temperature (° C.) | 10 | 10 | 10 | 10 | 10 | 10 |
| | Styrene/butadiene composition ratio | 65/35 | 65/35 | 65/35 | 65/35 | 65/35 | 65/35 |
| (B) polymer latex | Glass transition temperature (core part) (° C.) | −37 | −37 | −37 | −37 | −37 | −37 |
| | Glass transition temperature (shell part) (° C.) | 35 | 35 | 35 | 35 | 35 | 35 |
| | Amount of (B) (vs. 100 parts of (A)) | 10 | 10 | 10 | 10 | 10 | 10 |
| Amount of binder resin (vs. 100 parts of negative electrode active material) | | 1 | 1 | 1 | 2 | 3 | 1 |
| Water-soluble polymer | Type | WP | Combination with CMC (WP) | CMC (MAC800LC) | CMC (MAC800LC) | CMC (MAC800LC) | CMC (MAC800LC) |
| | Amount of water-soluble polymer (vs. 100 parts of negative electrode active material) | 1 | 1 | 1 | 1 | 1 | 1 |
| Negative electrode active material | Type of silicon-based active material and silicon | SiO$_x$(Carbon coat) | SiO$_x$(Carbon coat) | SiO$_x$(Carbon coat) | SiO$_x$(Carbon coat) | SiO$_x$(Carbon coat) | SiO—C |
| | Blending ratio of carbon-based active material/silicon-based active material | 95/5 | 95/5 | 95/5 | 85/15 | 70/30 | 95/5 |

TABLE 2-continued

| Evaluation | Initial swelling | B | B | B | B | C | B |
|---|---|---|---|---|---|---|---|
| | Swelling after cycle | A | A | B | B | B | B |
| | Cycle characteristic | A | A | A | B | B | A |
| | Rate characteristic | A | A | A | A | A | A |
| | Adhesion | A | A | A | A | A | A |

TABLE 3

| | | Ex. 25 | Ex. 26 | Ex. 27 | Ex. 28 | Ex. 29 | Ex. 30 |
|---|---|---|---|---|---|---|---|
| (A) styrene-butadiene copolymer latex | Gel amount (%) | 93 | 93 | 93 | 93 | 93 | 93 |
| | Glass transition temperature (° C.) | 10 | 10 | 10 | 10 | 10 | 10 |
| | Styrene/butadiene composition ratio | 65/35 | 65/35 | 65/35 | 65/35 | 65/35 | 65/35 |
| (B) polymer latex | Glass transition temperature (core part) (° C.) | −37 | −37 | −37 | −37 | −37 | −37 |
| | Glass transition temperature (shell part) (° C.) | 35 | 35 | 35 | 35 | 35 | 35 |
| | Amount of (B) (vs. 100 parts of (A)) | 10 | 10 | 10 | 10 | 10 | 10 |
| Amount of binder resin (vs. 100 parts of negative electrode active material) | | 2 | 3 | 1 | 2 | 3 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) |
| | Amount of water-soluble polymer (vs. 100 parts of negative electrode active material) | 1 | 1 | 1 | 1 | 1 | 1 |
| Negative electrode active material | Type of silicon-based active material and silicon | SiO—C | SiO—C | Si—C | Si—C | Si—C | Si |
| | Blending ratio of carbon-based active material/silicon-based active material | 85/15 | 70/30 | 95/5 | 85/15 | 70/30 | 95/5 |
| Evaluation | Initial swelling | B | C | B | B | C | B |
| | Swelling after cycle | B | B | B | B | B | B |
| | Cycle characteristic | B | B | A | B | B | A |
| | Rate characteristic | A | A | A | A | A | A |
| | Adhesion | A | A | A | A | A | A |

| | | Ex. 31 | Ex. 32 | Ex. 33 | Ex. 34 | Ex. 35 | Ex. 36 |
|---|---|---|---|---|---|---|---|
| (A) styrene-butadiene copolymer latex | Gel amount (%) | 93 | 93 | 75 | 75 | 75 | 93 |
| | Glass transition temperature (° C.) | 10 | 10 | −10 | 30 | 50 | 50 |
| | Styrene/butadiene composition ratio | 65/35 | 65/35 | 55/45 | 75/25 | 85/15 | 85/15 |
| (B) polymer latex | Glass transition temperature (core part) (° C.) | −37 | −37 | −37 | −37 | −37 | −37 |
| | Glass transition temperature (shell part) (° C.) | 35 | 35 | 35 | 35 | 35 | 35 |
| | Amount of (B) (vs. 100 parts of (A)) | 10 | 10 | 10 | 10 | 10 | 10 |
| Amount of binder resin (vs. 100 parts of negative electrode active material) | | 2 | 3 | 1 | 1 | 1 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) |
| | Amount of water-soluble polymer (vs. 100 parts of negative electrode active material) | 1 | 1 | 1 | 1 | 1 | 1 |
| Negative electrode active material | Type of silicon-based active material and silicon | Si | Si | $SiO_x$(Carbon coat) | $SiO_x$(Carbon coat) | $SiO_x$(Carbon coat) | $SiO_x$(Carbon coat) |
| | Blending ratio of carbon-based active material/silicon-based active material | 85/15 | 70/30 | 95/5 | 95/5 | 95/5 | 95/5 |
| Evaluation | Initial swelling | B | C | C | C | C | A |
| | Swelling after cycle | B | B | C | C | C | A |
| | Cycle characteristic | B | B | B | C | C | A |
| | Rate characteristic | A | A | B | B | B | A |
| | Adhesion | A | A | A | B | C | C |

TABLE 4

|  |  | Ex. 37 | Ex. 38 | Ex. 39 | Ex. 40 | Ex. 41 | Ex. 42 |
|---|---|---|---|---|---|---|---|
| (A) styrene-butadiene copolymer latex | Gel amount (%) | 95 | 95 | 95 | 95 | 93 | 93 |
|  | Glass transition temperature (° C.) | −10 | 10 | 30 | 50 | 10 | 10 |
|  | Styrene/butadiene composition ratio | 55/45 | 65/35 | 75/25 | 85/15 | 65/36 | 65/35 |
| (B) polymer latex | Glass transition temperature (core part) (° C.) | −37 | −37 | −37 | −37 | −50 | −50 |
|  | Glass transition temperature (shell part) (° C.) | 35 | 35 | 35 | 35 | 45 | 25 |
|  | Amount of (B) (vs. 100 parts of (A)) | 10 | 10 | 10 | 10 | 10 | 10 |
| Amount of binder resin (vs. 100 parts of negative electrode active material) |  | 1 | 1 | 1 | 1 | 1 | 1 |
| Water-soluble polymer | Type | CMC (MAC800LC) | CMC (MAC800LC) | CMC (MAC800LC) | CMC (MAC800LC) | CMC (MAC801LC) | CMC (MAC801LC) |
|  | Amount of water-soluble polymer (vs. 100 parts of negative electrode active material) | 1 | 1 | 1 | 1 | 1 | 1 |
| Negative electrode active material | Type of silicon-based active material and silicon | $SiO_x$(Carbon coat) | $SiO_x$(Carbon coat) | $SiO_x$(Carbon coat) | $SiO_x$(Carbon coat) | $SiO_x$(Carbon coat) | $SiO_x$(Carbon coat) |
|  | Blending ratio of carbon-based active material/silicon-based active material | 95/5 | 95/5 | 95/5 | 95/5 | 95/5 | 95/5 |
| Evaluation | Initial swelling | A | A | B | B | B | B |
|  | Swelling after cycle | B | A | B | B | A | B |
|  | Cycle characteristic | A | A | B | B | A | A |
|  | Rate characteristic | A | A | A | A | A | A |
|  | Adhesion | A | A | B | C | A | A |

|  |  | Ex. 43 | Ex. 44 | Ex. 45 | Ex. 46 | Ex. 47 | Ex. 48 |
|---|---|---|---|---|---|---|---|
| (A) styrene-butadiene copolymer latex | Gel amount: (%) | 93 | 93 | 93 | 93 | 93 | 93 |
|  | Glass transition temperature (° C.) | 10 | 10 | 10 | 10 | 10 | 10 |
|  | Styrene/butadiene composition ratio | 65/36 | 65/35 | 65/36 | 65/35 | 65/36 | 65/35 |
| (B) polymer latex | Glass transition temperature (core part) (° C.) | 10 | 10 | −50 | −50 | −37 | −37 |
|  | Glass transition temperature (shell part) (° C.) | 25 | 45 | 60 | 15 | 60 | 15 |
|  | Amount of (B) (vs. 100 parts of (A)) | 10 | 10 | 10 | 10 | 10 | 10 |
| Amount of binder resin (vs. 100 parts of negative electrode active material) |  | 1 | 1 | 1 | 1 | 1 | 1 |
| Water-soluble polymer | Type | CMC (MAC801LC) | CMC (MAC801LC) | CMC (MAC801LC) | CMC (MAC801LC) | CMC (MAC801LC) | CMC (MAC801LC) |
|  | Amount of water-soluble polymer (vs. 100 parts of negative electrode active material) | 1 | 1 | 1 | 1 | 1 | 1 |
| Negative electrode active material | Type of silicon-based active material and silicon | $SiO_x$(Carbon coat) | $SiO_x$(Carbon coat) | $SiO_x$(Carbon coat) | $SiO_x$(Carbon coat) | $SiO_x$(Carbon coat) | $SiO_x$(Carbon coat) |
|  | Blending ratio of carbon-based active material/silicon-based active material | 95/5 | 95/5 | 95/5 | 95/5 | 95/5 | 95/5 |
| Evaluation | Initial swelling | B | B | B | B | B | B |
|  | Swelling after cycle | B | B | B | B | B | B |

TABLE 4-continued

|  |  |  |  |  |  |  |
|---|---|---|---|---|---|---|
| Cycle characteristic | B | B | B | B | B | B |
| Rate characteristic | B | B | B | B | B | B |
| Adhesion | B | B | B | B | B | B |

TABLE 5

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| (A) styrene-butadiene copolymer latex | Gel amount (%) | 60 | 93 | 93 | 93 | 93 | 93 | — |
|  | Glass transition temperature (° C.) | 10 | 70 | −40 | 10 | 10 | 10 | — |
|  | Styrene/butadiene composition ratio | 65/35 | 90/10 | 35/65 | 65/35 | 65/35 | 65/35 | — |
| (B) polymer latex | Glass transition temperature (core part) (° C.) | −37 | −37 | −37 | −37 | None | — | −37 |
|  | Glass transition temperature (shell part) (° C.) | 35 | 35 | 35 | None | 35 | — | 35 |
|  | Amount of (B) (vs. 100 parts of (A)) | 10 | 10 | 10 | 10 | 10 | 10 | 10 |
| Amount of binder resin (vs. 100 parts of negative electrode active material) |  | 1 | 1 | 1 | 1 | 1 | 1 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) | CMC (MAC800LC) |
|  | Amount of water-soluble polymer (vs. 100 parts of negative electrode active material) | 1 | 1 | 1 | 1 | 1 | 1 | 1 |
| Negative electrode active material | Type of silicon-based active material and silicon | $SiO_x$ (Carbon coat) | $SiO_x$ (Carbon coat) | $SiO_x$ (Carbon coat) | $SiO_x$ (Carbon coat) | $SiO_x$ (Carbon coat) | $SiO_x$ (Carbon coat) | $SiO_x$ (Carbon coat) |
|  | Blending ratio of carbon-based active material/silicon-based active material | 95/5 | 95/5 | 95/5 | 95/5 | 95/5 | 95/5 | 95/5 |
| Evaluation | Initial swelling | D | D | D | D | D | C | D |
|  | Swelling after cycle | D | D | D | D | D | C | D |
|  | Cycle characteristic | D | D | D | D | D | C | D |
|  | Rate characteristic | C | C | C | C | C | C | C |
|  | Adhesion | C | D | C | C | D | C | C |

TABLE 5-continued

|  |  | Comp. Ex. 8 | Comp. Ex. 9 | Comp. Ex. 10 | Comp Ex. 11 | Comp Ex. 12 | Comp. Ex. 13 |
|---|---|---|---|---|---|---|---|
| (A) styrene-butadiene copolymer latex | Gel amount (%) | 65 | 75 | 75 | 99 | 99 | 99 |
|  | Glass transition temperature (° C.) | 10 | 70 | −40 | 10 | −40 | 70 |
|  | Styrene/butadiene composition ratio | 65/35 | 90/10 | 35/65 | 65/35 | 35/65 | 90/10 |
| (B) polymer latex | Glass transition temperature (core part) (° C.) | −37 | −37 | −37 | −37 | −37 | −37 |
|  | Glass transition temperature (shell part) (° C.) | 35 | 35 | 35 | 35 | 35 | 35 |
|  | Amount of (B) (vs. 100 parts of (A)) | 10 | 10 | 10 | 10 | 10 | 10 |
| Amount of binder resin (vs. 100 parts of negative electrode active material) |  | 1 | 1 | 1 | 1 | 1 | 1 |
| Water-soluble polymer | Type | CMC (MAC800LC) | CMC (MAC800LC) | CMC (MAC800LC) | CMC (MAC800LC) | CMC (MAC800LC) | CMC (MAC800LC) |
|  | Amount of water-soluble polymer (vs. 100 parts of negative electrode active material) | 1 | 1 | 1 | 1 | 1 | 1 |
| Negative electrode active material | Type of silicon-based active material and silicon | $SiO_x$(Carbon coat) | $SiO_x$(Carbon coat) | $SiO_x$(Carbon coat) | $SiO_x$(Carbon coat) | $SiO_x$(Carbon coat) | $SiO_x$(Carbon coat) |
|  | Blending ratio of carbon-based active material/silicon-based, active material | 95/5 | 95/5 | 95/5 | 95/5 | 95/5 | 95/5 |
| Evaluation | Initial swelling | D | D | D | D | D | D |
|  | Swelling after cycle | D | D | D | D | D | D |
|  | Cycle characteristic | D | D | C | D | D | D |
|  | Rate characteristic | C | D | C | D | D | D |
|  | Adhesion | C | D | C | C | C | D |

As shown in Tables 1 to 5, initial swelling and swelling after cycle can be suppressed and the cycle characteristic, the rate characteristic and adhesion are all improved by using a binder resin including (A) a styrene-butadiene copolymer latex having a gel amount of 70 to 98% and having a glass transition temperature in dynamic viscoelasticity measurement with a single peak at −30° C. to 60° C. and (B) a polymer latex formed of a core-shell hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., and a negative electrode active material including at least one of silicon and a silicon-based active material, and carbon.

The invention claimed is:

1. A negative electrode slurry composition comprising a binder resin, a water-soluble polymer, and a negative electrode active material,
wherein the binder resin comprising (A) a styrene-butadiene copolymer latex having a gel amount of 70 to 98% and having a glass transition temperature in dynamic viscoelasticity measurement with a single peak at −30° C. to 60° C. and (B) a polymer latex formed of a hetero-phase structure having a glass transition temperature in dynamic viscoelasticity measurement with at least one peak at −100° C. to 10° C. and having a glass transition temperature in dynamic viscoelasticity measurement with at least one peak at 10° C. to 100° C., a mass ratio (St/BD) of a styrene unit (St) and a 1,3-butadiene unit (BD) in the (A) styrene-butadiene copolymer latex is 55/45 to 87/13, and the negative electrode active material comprising a carbon-based active material and a silicon-based active material.

2. The negative electrode slurry composition according to claim 1, wherein the (B) polymer latex has a glass transition temperature in dynamic viscoelasticity measurement with at least one peak at −60° C. to 10° C., and has a glass transition temperature in dynamic viscoelasticity measurement with at least one peak at 10° C. to 65° C.

3. The negative electrode slurry composition according to claim 1, wherein the negative electrode slurry composition comprises 0.1 to 50 parts by mass of the (B) polymer latex in terms of a solid content based on 100 parts by mass of the (A) styrene-butadiene copolymer latex in terms of a solid content.

4. The negative electrode slurry composition according to claim 1, wherein the negative electrode active material contains 0.1 to 50 parts by mass of the silicon-based active material based on 100 parts by mass of the carbon-based active material contained in the negative electrode active material.

5. The negative electrode slurry composition according to claim 1, wherein the silicon-based active material is $SiO_x$ ($0.01 \leq x < 2$) formed of at least one of SiO and $SiO_2$, and Si.

6. The negative electrode slurry composition according to claim 1, wherein at least one of the silicon-based active materials is combined with conductive carbon.

7. A lithium ion secondary battery negative electrode which is formed by applying the negative electrode slurry composition according to claim 1 onto a current collector and drying the negative electrode slurry composition.

8. A lithium ion secondary battery comprising the lithium ion secondary battery negative electrode according to claim 7.

* * * * *